US009104296B2

(12) United States Patent
Kaleta et al.

(10) Patent No.: US 9,104,296 B2
(45) Date of Patent: Aug. 11, 2015

(54) ROCKET EFFECT IN A PROGRESS BAR

(75) Inventors: Damian Kaleta, San Jose, CA (US); Kevin Decker, San Jose, CA (US); Dan Bernstein, San Francisco, CA (US); Beth Dakin, San Jose, CA (US); Simon Fraser, Sunnyvale, CA (US); Samuel Weinig, Sunnyvale, CA (US); Dave Hyatt, Woodlands, TX (US); Geoffrey Garen, San Jose, CA (US)

(73) Assignee: Apple Inc., Cupertino, CA (US)

(*) Notice: Subject to any disclaimer, the term of this patent is extended or adjusted under 35 U.S.C. 154(b) by 184 days.

(21) Appl. No.: 13/614,762

(22) Filed: Sep. 13, 2012

(65) Prior Publication Data

US 2013/0239039 A1    Sep. 12, 2013

Related U.S. Application Data

(60) Provisional application No. 61/609,238, filed on Mar. 9, 2012.

(51) Int. Cl.
  *G06F 3/048* (2013.01)
  *G06F 3/0484* (2013.01)
  *G06F 3/0481* (2013.01)

(52) U.S. Cl.
  CPC ............ *G06F 3/0484* (2013.01); *G06F 3/0481* (2013.01)

(58) Field of Classification Search
  CPC .................................................. G06F 3/04847
  USPC ........................................................ 715/772
  See application file for complete search history.

(56) References Cited

U.S. PATENT DOCUMENTS

| | | | | |
|---|---|---|---|---|
| 5,623,590 | A  * | 4/1997 | Becker et al. | 715/772 |
| 6,275,987 | B1 * | 8/2001 | Fraley et al. | 717/127 |
| 6,335,736 | B1   | 1/2002 | Wagner et al. | |
| 6,927,770 | B2   | 8/2005 | Ording | |
| 7,577,632 | B2   | 8/2009 | Thompson et al. | |
| 7,917,847 | B2   | 3/2011 | Uematsu et al. | |
| 8,037,527 | B2   | 10/2011 | Milener et al. | |
| 8,156,342 | B2   | 4/2012 | Roth et al. | |
| 8,171,419 | B2   | 5/2012 | Mujkic et al. | |
| 2001/0055017 | A1 * | 12/2001 | Ording | 345/440 |
| 2003/0163478 | A1 * | 8/2003 | Kirkland | 707/102 |
| 2003/0182409 | A1 * | 9/2003 | Seaman | 709/223 |
| 2004/0078453 | A1 * | 4/2004 | Bhogal et al. | 709/219 |

(Continued)

FOREIGN PATENT DOCUMENTS

| | | |
|---|---|---|
| CN | 102141953 A | 8/2011 |
| TW | 200847015 A | 12/2008 |

OTHER PUBLICATIONS

Wowpedia, Blizzard Launcher, Jan. 27, 2012, Wowpedia, pp. 1-5.*

(Continued)

*Primary Examiner* — Boris Pesin
*Assistant Examiner* — Justin Lee
(74) *Attorney, Agent, or Firm* — Morgan, Lewis & Bockius LLP

(57) ABSTRACT

Some embodiments relate to providing an improved progress indicator in a graphical user interface. In addition to conveying a completion status of a task to a user, an improved progress indicator in some embodiments can convey additional information about the task to the user. For example, some embodiments can display a visual cue when a triviality threshold indicating that the task is "substantially complete" is met.

21 Claims, 15 Drawing Sheets

(56) References Cited

U.S. PATENT DOCUMENTS

| | | | |
|---|---|---|---|
| 2005/0102631 A1* | 5/2005 | Andreas et al. | 715/772 |
| 2005/0149874 A1 | 7/2005 | Kokko et al. | |
| 2005/0222965 A1* | 10/2005 | Chaudhuri et al. | 707/1 |
| 2007/0168861 A1 | 7/2007 | Bell et al. | |
| 2008/0256474 A1 | 10/2008 | Chakra et al. | |
| 2008/0270928 A1* | 10/2008 | Chakra et al. | 715/772 |
| 2009/0064143 A1 | 3/2009 | Bhogal et al. | |
| 2009/0083859 A1* | 3/2009 | Roth et al. | 726/28 |
| 2010/0083159 A1* | 4/2010 | Mountain | 715/772 |
| 2010/0150522 A1 | 6/2010 | Schmehl | |
| 2010/0162139 A1* | 6/2010 | Beebe et al. | 715/760 |
| 2010/0313159 A1* | 12/2010 | Decker et al. | 715/772 |
| 2011/0254856 A1 | 10/2011 | Yoo et al. | |
| 2011/0295979 A1 | 12/2011 | Alstad et al. | |
| 2011/0302524 A1* | 12/2011 | Forstall | 715/781 |
| 2012/0032945 A1 | 2/2012 | Dare et al. | |
| 2012/0075327 A1 | 3/2012 | MacKenzie | |
| 2012/0096383 A1* | 4/2012 | Sakamoto et al. | 715/772 |
| 2012/0159370 A1* | 6/2012 | Rode et al. | 715/772 |
| 2013/0235044 A1 | 9/2013 | Kaleta et al. | |
| 2013/0239040 A1 | 9/2013 | Kaleta et al. | |
| 2013/0246962 A1 | 9/2013 | Kaleta et al. | |

OTHER PUBLICATIONS

Bonesoft, Progress-O-Doom, Jan. 21, 2009, Code Project, pp. 1-24.*

Harrison, C., Amento, B., Kuznetsov, S., and Bell, R. 2007. Rethinking the progress bar. In Proceedings of the 20th Annual ACM Symposium on User interface Software and Technology (Newport, Rhode Island, USA, Oct. 7-10, 2007). UIST '07. ACM, New York, NY. 115-118.*

Sexton, Sean, .NET Basics—Do Work in Background Thread to Keep GUI Responsive, Sean's Stuff, pp. 1-33.*

Bryce, Tim, The 99% complete syndrome, Oct. 23, 2011, The Bryce is right, pp. 1-6.*

Benson, Don, WiX toolset, Mar. 18, 2009, sourceforge, pp. 1-5.*

Harrison, et al., "Rethinking the Progress Bar," 20th Annual ACM Symposium on User Interface Software and Technology, Oct. 2007, pp. 115-118.

Non-Final Office Action for U.S. Appl. No. 13/615,025, mailed May 2, 2014, 24 pages.

Jones, R., "The new streaming WoW launcher," Oct. 13, 2010, Tech bits, pp. 1-2.

Non-Final Office Action for U.S. Appl. No. 13/615,140, mailed Aug. 13, 2014, 17 pages.

Non-Final Office Action for U.S. Appl. No. 13/615,120, mailed Aug. 27, 2014, 22 pages.

BoneSoft, "Progress-O-Doom", Jan. 21, 2009, Wowpedia, 20 pages.

Office Action dated Apr. 9, 2014, received in Australian Patent Application No. 2013201390, which corresponds to U.S. Appl. No. 13/614,762, 2 pages. (Kaleta).

Office Action dated Dec. 24, 2014, received in Korean Patent Application No. 10-2013025869, which corresponds to U.S. Appl. No. 13/614,762, 5 pages. (Kaleta).

Ofifce Action dated Oct. 28, 2014, received in Taiwan Patent Application No. 102108323, which corresponds to U.S. Appl. No. 13/614,762, 7 pages. (Kaleta).

Final Office Action dated Mar. 26, 2015, received in U.S. Appl. No. 13/615,120, 9 pages.

* cited by examiner

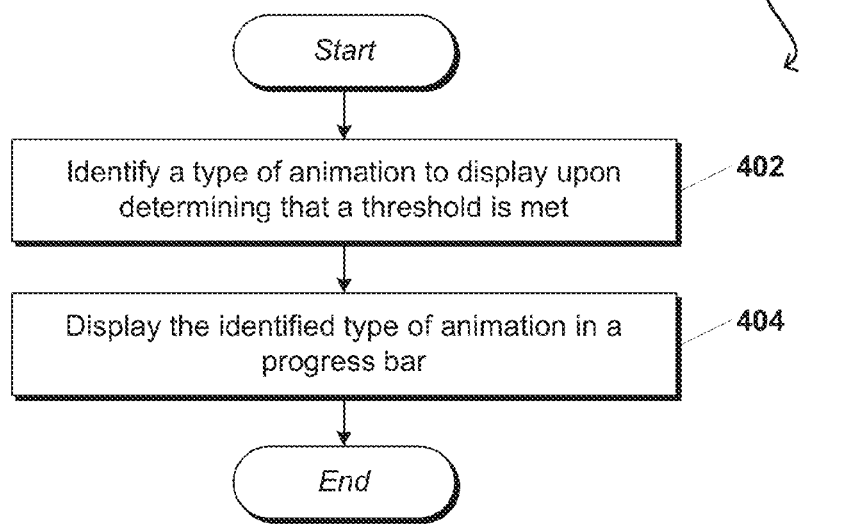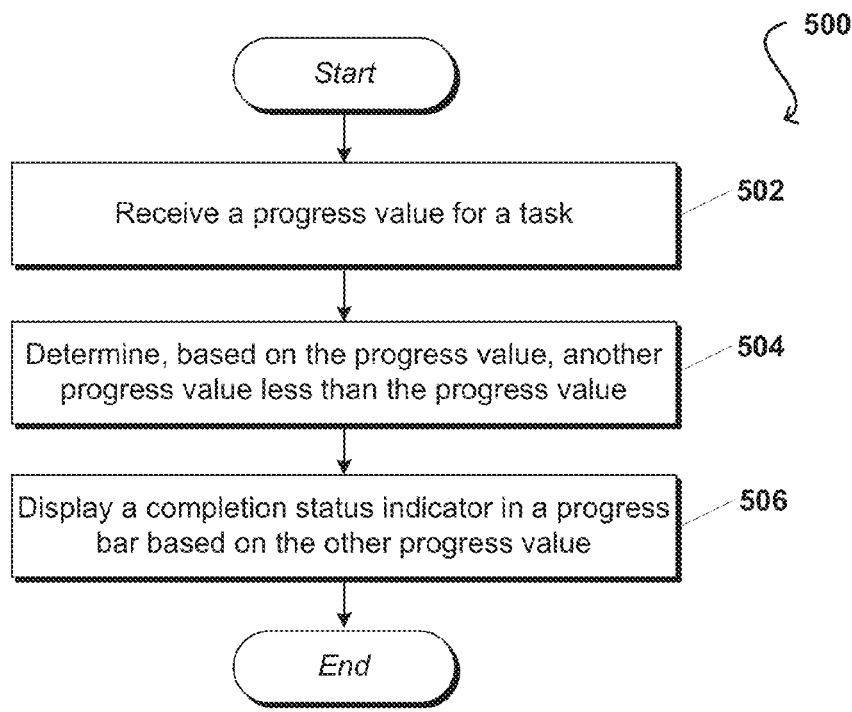

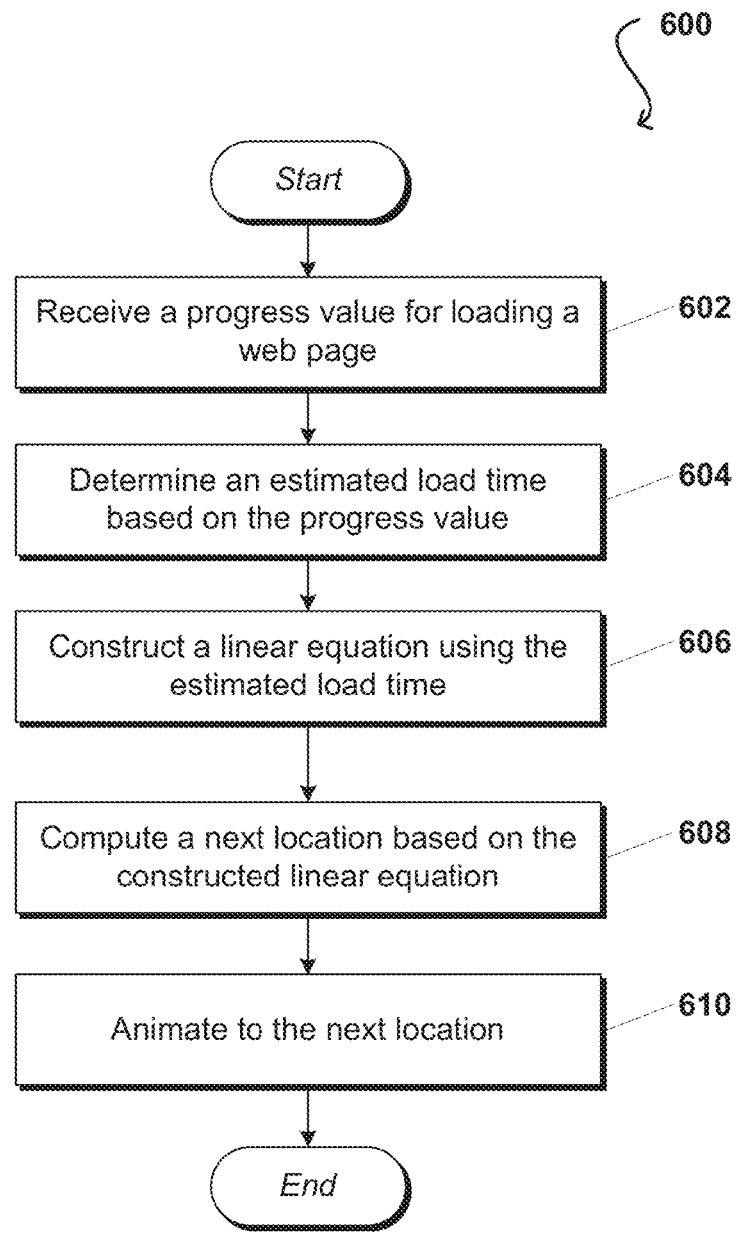

FIG. 8

| Progress Value | Time Estimate |
|---|---|
| 0% < progress value <= 35% | 30 seconds |
| 35% < progress value <= 60% | 10 seconds |
| 60% < progress value <= 80% | 5 seconds |
| 80% < progress value <= 85% | 3 seconds |
| 85% < progress value | 2.5 seconds |

Progress value = 40%
F(t) = .1t      At t = 3, F(3) = .3 or 300 pixels

Address www.url.com ▽ ➔ GO

At t = 3.2, F(3.2) = .32 or 320 pixels

Address www.url.com ▽ ➔ GO

At t = 3.4, F(3.4) = .34 or 340 pixels

Address www.url.com ▽ ➔ GO

New progress value received at t = 3.4
F(t) = .132t - .1088      At t = 3.6, F(3.6) = .37 or 370 pixels Address www.url.com ▽ ➔ GO At t = 3.8, F(3.8) = .39 or 390 pixels Address www.url.com ▽ ➔ GO At t = 4, F(4) = .42 or 420 pixels Address www.url.com ▽ ➔ GO

At t = T₁
Address [www.url.com]  ▽ → GO

At t = T₂
Address [▓▓▓▓▓▓▓▓▓▓▓]  ▽ → GO

At t = T₃
Address [www.url.com░░░]  ▽ → GO

At t = T₁
Address [www.url.com\/\/\/\/\/\/]  ▽ → GO

At t = T₂
Address [www.url.com\/\/\/\/]  ▽ → GO

At t = T₃
Address [www.url.com  ～～]  ▽ → GO

At t = T₁
Address [www.url.com]  ▽ → GO

At t = T₂
Address [www.url.com]  ▽ → GO

At t = T₃
Address [www.url.com]  ▽ → GO

1700

ROCKET EFFECT IN A PROGRESS BAR

CROSS-REFERENCES TO RELATED APPLICATIONS

This application claims priority to and the benefit of U.S. Provisional Application No. 61/609,238, filed Mar. 9, 2012 and entitled "Progress Bar," the entire disclosure of which is herein incorporated by reference for all purposes.

BACKGROUND

The present disclosure relates generally to progress bars and in particular to various improvements to progress bars that can enhance a user's experience.

A progress bar (also sometimes referred to as a status bar, or a completion status bar, etc.) is commonly used to convey a completion status of a task or a process, such as a loading of a web page, a file download, data transfer, etc. Different application programs may use progress bars in various different contexts. In one example, a browser application may use a progress bar to indicate a completion status of a web page being loaded for presentation to a user. In response to the user's selection of a uniform resource locator (URL) for a web page, the browser application may display a progress bar that conveys a completion status of the loading of the web page. The progress bar can be updated as the completion status of the loading of the web page changes. As such, via the progress bar, the user can roughly estimate a total completion time for the loading of the web page.

A progress bar typically includes a completion status indicator that visually represents the completion status of a task or the operation being performed. The completion status indicator may, for example, be in the form of a slider bar that moves from a start position towards an end position, where reaching the end position signals completion of the task or operation. In such an embodiment, the position of the completion status indicator can convey the completion status (e.g., a percentage of the task being completed) of the task or operation to the user. The user can use the information conveyed by the completion status indicator to approximate a completion time for the task or operation.

Conventional progress bars have a number of problems. First, due to the complexity of modern computing systems, varying disk, memory, processor, bandwidth and other factors can cause existing progress bars to exhibit non-linear behaviors, such as acceleration, deceleration, and pauses. This irregular behavior of progress bars can cause the progress bars to appear slow, clunky, and inaccurate in conveying an estimated completion time to a user.

SUMMARY

Certain embodiments of the present invention provide techniques for displaying an improved progress bar on a graphical user interface (GUI) that enhances a user's computing experience.

In some embodiments, a visual cue can be provided in a progress bar to alert a user when a triviality threshold is met. The triviality threshold can refer to a threshold at which an average person would consider a task to be complete regardless of whether the task is actually complete. For instance, an average person may consider the triviality threshold for loading a particular sports web page to be met at the instant that one or more sports articles have become visible, regardless of whether the remaining elements of the page, including various images, advertisements, hyperlinks, etc., have been loaded. The visual cue can be an animation of an accelerated progression of a completion status indicator in a progress bar. By providing a visual cue when the triviality threshold is met, the user can be informed of when "essential" portions of the page are viewable regardless of whether the entire page has been loaded, instead of having to wait until the entire page is loaded.

The following detailed description together with the accompanying drawings will provide a better understanding of the nature and advantages of the present invention.

BRIEF DESCRIPTION OF THE DRAWINGS

FIG. 4 illustrates an example process of some embodiments for displaying the rocket animation.

FIG. 5 illustrates an example process of some embodiments for displaying an underreported progress status for a task in a progress bar.

FIG. 6 illustrates another example process of some embodiments for displaying an underreported progress status for a task in a progress bar.

FIG. 8 illustrates an example of a time estimate table of some embodiments that enables browser application to obtain a time estimate until a task is complete based on a progress value.

FIG. 9 illustrates an example sequence of a progress bar that updates smoothly while underreporting an actual status of a task in accordance with some embodiments.

FIG. 15 illustrates another example progression for displaying a secondary progress indicator along with a completion status indicator of a task in a progress bar according to some embodiments.

FIG. 16 illustrates another example progression for displaying another type of secondary progress indicator along with a completion status indicator of a task in a progress bar according to some embodiments.

FIG. 17 illustrates another example progression for displaying a type of secondary progress indicator along with a completion status indicator of a task in a progress bar according to some embodiments.

DETAILED DESCRIPTION

Figure 1:
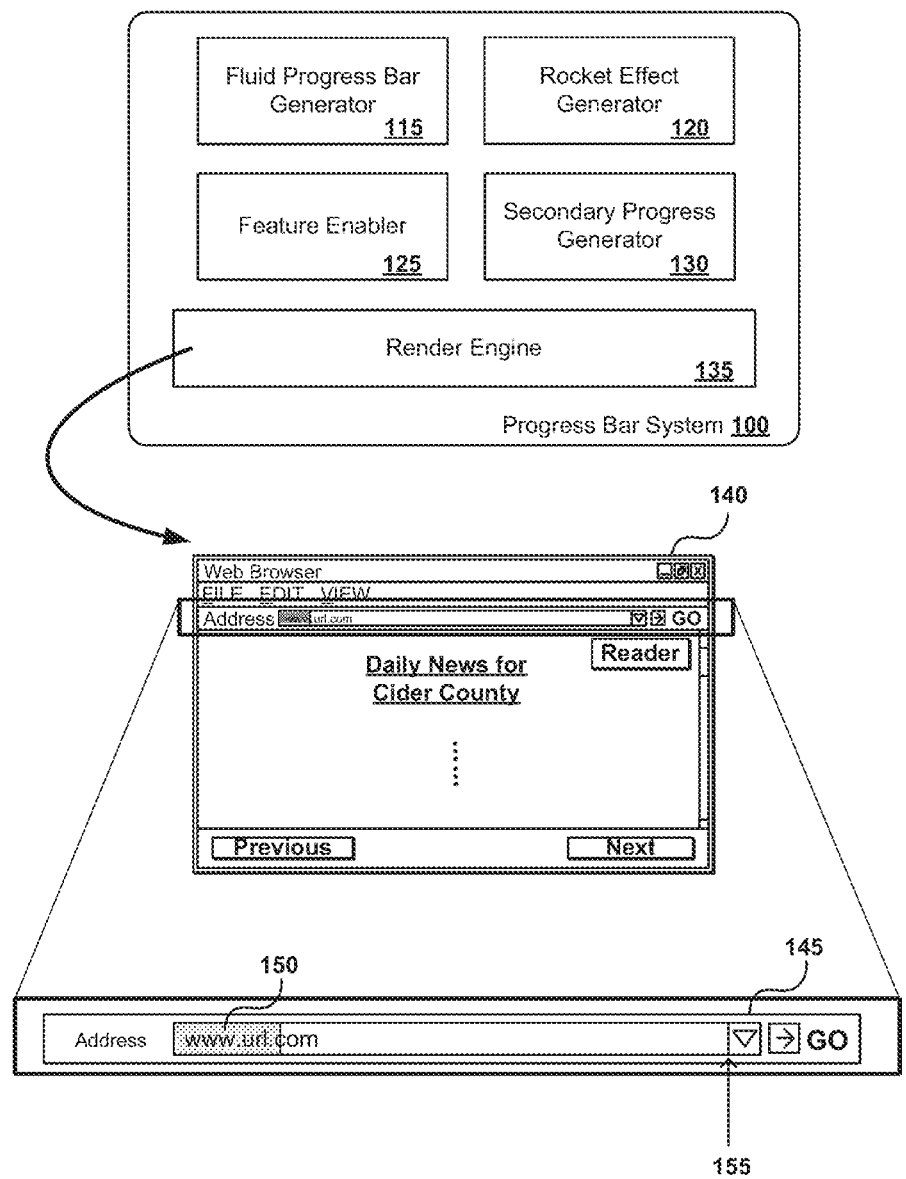
FIG. 1 illustrates an example of a progress bar system for generating and displaying a user interface (in this example, web browser) that includes a progress bar in accordance with some embodiments of the present invention.

In the following description, numerous details, examples and embodiments are set forth for the purposes of explanation. However, one of ordinary skill in the art will recognize that the invention is not limited to the embodiments set forth and that the invention may be practiced without some of the specific details discussed. Further, some of the examples and embodiments, including well-known structures and devices, are shown in block diagram form in order not to obscure the description with unnecessary detail.

Certain embodiments of the present invention provide techniques for displaying an improved progress bar on a graphical user interface (GUI) that enhances user computing experience. A progress bar can display a completion status indicator that allows a user to visualize a completion status of an ongoing task or operation. In some embodiments, the user can use the progress bar to verify that performance of the operation is proceeding successfully and to estimate a completion time for the operation by observing the completion status indicator.

A progress bar in some embodiments can display a completion status indicator that underreports the completion status of an ongoing task. For instance, a web browser can determine an over-estimated load time for a web page to prevent the completion status indicator from stalling at the end of the progress bar. Further, in some embodiments, the completion status indicator is displayed and updated in a smooth manner. In such embodiments, linear functions are used to determine a location to which to animate the progression of the completion status indicator within certain intervals. This eliminates discrete jumps and adds fluidity to the progression of the reported status such that the progress bar can appear more intuitive and responsive to the user.

In some embodiments, a visual cue can be provided to alert a user when a threshold indicating that a task is "substantially complete" (also referred to as a triviality threshold) is met. As such, progress bars can provide a visual cue to a user to indicate when subtasks of a task of interest to the user is complete. In some embodiments, the visual cue can be an animation of an accelerated progression of a completion status indicator in a progress bar. In some embodiments, a triviality threshold refers to a threshold at which an average person would consider a task to be complete regardless of whether the task is actually complete. For instance, an average person may consider the triviality threshold for loading a particular sports web page met once one or more sports articles are visible, regardless of whether the rest of the page (e.g., including various images, advertisements, hyperlinks, etc.) is loaded. By providing a visual cue when the triviality threshold is met, the user can be informed of when portions of the page is viewable regardless of whether the page is loaded, instead of having to wait until the entire page is loaded.

In some embodiments, the manner in which a user interface (UI) element is displayed may be tied to the display of a progress bar. For example, a GUI element may be visually enabled in response to the position or completion status indicated by the completion status indicator in a progress bar. In some instances, the GUI may include a button (e.g., a button corresponding to a reader function) that is visually enabled (i.e., its function enabled) upon the triviality threshold being met and the completion status indicator animated to show completed status. In this manner, the visual display of a UI element may be changed in response to the completion status indicated by the progress bar in order to highlight the feature represented by the UI element. In one embodiment, the element may be visually displayed and modified in a manner so as to draw a user's attention to the UI element.

In some embodiments, in addition to showing the completion status of a task or operation (shown by the completion status indicator of the progress bar), a progress bar may also visually indicate (e.g., using an animation) a speed at which the task is being performed at a point in time. Conveying to a user the loading rate allows the user to distinguish between loading a relatively large web page with a fast loading rate and loading a relatively small web page with a slow loading rate. Since in some instances, a slow loading rate could mean a poor connection between the user and a particular server, the user may want to cancel his or her requests for data from that server when the loading rate is unacceptably slow. The user can determine whether to stay on a current web page or to switch to a different one based on the speed at which the page is being loaded in some instances.

Various different animations may be used to display the speed. For example, the progress bar may display animated waves or ripples with the speed of the waves or ripples indicating the speed of the task or operation being performed. In this example, faster animation of the waves or ripples indicates faster speed (e.g., when a web page is loading at 0.5 MB/s the waves or ripples may be displayed at one animation speed and when the loading rate is at 1 GB/s the waves or ripples may be displayed at a faster animation speed). The speed of the animation provides a visual cue to the user of how fast the task or operation is being performed.

The terms "status of task" or "progress of task" can be used herein to refer to the amount or percentage of the task or operation that is complete at a moment in time. The terms "progress status indicator," "completion status indicator," or "status indicator" can be used herein to refer to a representation of a status or progress of a task in a progress bar. The term "progression of a completion status indicator" can be used herein to refer to the motion and/or rate at which the completion status indicator for the task shown in the progress bar is moving. One of ordinary skill would recognize that although the description is depicted with respect to a particular type of progress indicator, namely, a progress bar, other types of progress indicators that can indicate a status of a task or operation can be used as well.

FIG. 1 depicts a simplified high level block diagram of a progress bar system 100 in accordance with some embodiments of the invention. As shown in FIG. 1, progress bar system 100 can include multiple subsystems such as a fluid progress bar generator 115, a rocket effect generator 120, a feature enabler 125, a secondary progress generator 130, and a render engine 135. One or more communication paths can be provided to enable one or more of the subsystems to communicate with and exchange data with one another. The various components described in FIG. 1 can be implemented in software, hardware, or a combination thereof. In some embodiments, the software can be stored on a transitory or non-transitory computer readable storage medium and can be executed by one or more processing units.

It should be appreciated that progress bar system 100 as shown in FIG. 1 can include more or fewer components than those shown in FIG. 1. In some embodiments, progress bar system 100 can be a part of an electronic computing device, such as a computer or a handheld device. The various components in progress bar system 100 can be implemented as a stand-alone application or integrated into another application (e.g., a web browser application, an e-mail client, or any other application that can display progress bars), while in some embodiments the components in progress bar system 100 can be implemented within an operating system.

In some embodiments, progress bar system 100 can generate and display a progress bar to a user such as progress bar 145 depicted in FIG. 1. In some embodiments, progress bar 145 can include a completion status indicator 150 where the position of the completion status indicator indicates the completion status of a task. By observing a progression of the completion status indicator in progress bar 145, a user can identify the completion status of the page loading task in some embodiments. The various components in progress bar system 100 can provide visual enhancements to progress bar 145 such that additional useful information is conveyed to the user using progress bar 145.

In some embodiments, render engine 135 is configured to render and display content on a display of an electronic computing device. In some instances, render engine 135 can be embedded in a web browser that can retrieve a document (e.g., HTML, XML, image files, etc.) corresponding to a URL (e.g., input by a user) and cause render engine 135 to render a graphical representation of it on the display of the electronic computing device. In addition to generating a display of a web page, render engine 135 in some embodiments can generate a progress bar for display. In some embodiments, a web browser can determine progress values that indicate a total loaded percentage of a web page and provide those progress values to various subsystems in progress bar system 100. These subsystems can then use these progress values to perform various operations in relation to the progress bar.

In some embodiments, fluid progress bar generator 115 is configured to underreport of a status of an ongoing task (e.g., the loading of a web page). Since it is difficult to accurately determine how much of the task remains to be completed, underreporting the progress values to the users can manage the user's expectations. Further, underreporting the completion status up front would permit more space within the progress bar for the completion status indicator to progress such that stalling towards the end of the progress bar can be minimized or prevented. In some embodiments, fluid progress bar generator 115 can receive progress values from render engine 135 and determine a location in the progress bar to which to increment the completion status indicator for the task. The determined location can correspond to an underreported value of the status of the task.

As described above, fluid progress bar generator 115 is configured to smoothen the manner in which the completion status indicator in a progress bar is displayed and updated. This is done so as to reduce the (Junky updates typically associated with conventional progress bars. Smoothening the display and update of the completion status indicator in a progress bar enhances the user's visual experience with respect to progress bars.

In one embodiment, fluid progress bar generator 115 uses one or more linear functions to achieve the smoothening. Fluid progress bar generator 115 may construct a linear function and use a computation performed using the linear function to determine each new location for the completion status indicator within the progress bar to increment to within the time interval. In some embodiments, using a linear function to compute each next location allows the progression of the completion status indicator to appear to be incrementing smoothly and at a constant speed.

In some embodiments, a progress value can indicate a completion status of a task. Browser application in some embodiments can receive a progress value from render engine 135. When fluid progress bar generator 115 receives a new progress value, fluid progress bar generator 115 can use the progress value to estimate a new time until the task is completed (e.g., using a lookup table). Fluid bar generator 115 can then construct a new linear function using the newly estimated time. As such, the progression of completion status indicator continues to increase at a steady rate, although at a different rate from before. Regardless of the change in progression rate, constructing multiple linear equations to determine locations to increment for each time interval allows the progression of the completion status indicator to appear smooth and soothing to the user's eye. Incrementing the completion status indicator to steadily and within short time intervals causes its appearance to be smoothly increasing to a user.

In some embodiments, rocket effect generator 120 is configured to cause the progression of the completion status indicator in the progress bar to "rocket" or accelerate from its current position to a position indicative of completion of the task when a triviality threshold is met. For example, for progress bar 145 depicted in FIG. 1, when the triviality threshold is met, the completion status indicator is animated to advance from its current position to it end position 155, which indicates completion of the task to the user.

The triviality threshold for a task identifies a threshold at which a task, even though not fully completed, can be indicated as completed for purposes of the user. The triviality threshold is configurable and, for a task, is generally set to a threshold less than the full completion of the task. It should be appreciated in some embodiments, the triviality threshold can be set to the full completion of the task.

The triviality threshold may be application and task-context specific. For example, if the task is loading of a web page, the triviality threshold can be set to a threshold percentage of the web page being loaded, for example, when the page is deemed "substantially loaded" or "visually complete." In some embodiments, rocket effect generator 120 can determine a triviality threshold using a set of criteria. For example, the triviality threshold can be met when 30% of a web page has been loaded.

In some embodiments, rocket effect generator 120 can produce an animation that shows an accelerated progression of the completion status indicator from a current location in progress bar 105 to one end of progress bar 105. This would serve as a visual cue to the user that the page would appear complete to the user regardless of whether the page loading is complete. The user can use this visual cue as a signal that he or she may now start viewing the page.

Some embodiments can provide a visual modification of a user interface element in response to a completion status indicator indicating that the task is complete. In some embodiments, feature enabler 125 is configured to cause a visual modification of a user interface element representing a feature. In response to determining that the triviality threshold is met and a "rocket effect" being enabled, feature enabler 125 can determine whether a particular feature is "to be enabled" subsequent to the display of the "rocket effect." When feature enabler 130 determines that the feature (e.g., specified by the user) is enabled, render engine 115 in some embodiments can highlight the enabled feature or visually modify a user interface element representing the feature. In some embodiments, render engine 115 can display the visual modification to the user interface element immediately following the accelerated progression of the completion status indicator or "rocket effect" caused by rocket effect generator 120 in order to further highlight the enabled feature.

In some embodiments, secondary progress generator 135 is configured to cause an animation effect to be displayed by the progress bar, where the animation indicates a speed at which a task is being performed. In some embodiments, secondary progress generator 135 can monitor a speed at which the task, such as the loading of a web page, is currently being performed. Secondary progress generator 135 can determine an animation to be displayed in the progress bar to represent the speed. Secondary progress generator 135 can then cause render engine 115 to display the animation. The animation effect allows the user to identify the speed at which the task is being performed such that the user can determine.

Figure 2:
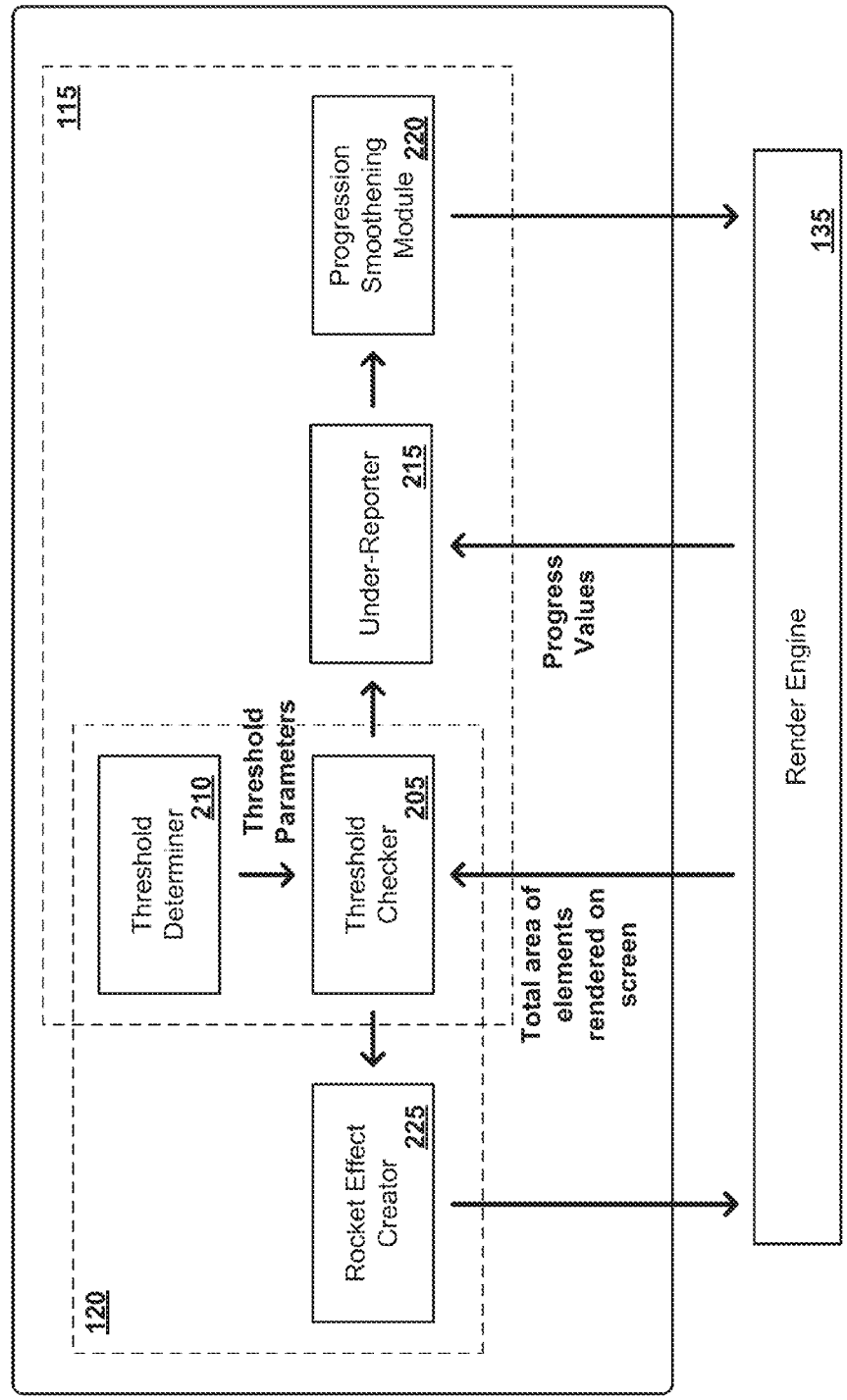
FIG. 2 illustrates an example of a more detailed diagram of fluid progress bar generator and rocket effect generator according to some embodiments.

FIG. 2 illustrates an example of a more detailed diagram 200 of fluid progress bar generator 115 and rocket effect generator 120 according to some embodiments. In FIG. 2, fluid progress bar generator 115 can include a threshold checker 205, a threshold determiner 210, an under-reporter 215, and a progression smoothening module 220. Rocket effect generator 120 in some embodiments can include a threshold checker 205, a threshold determiner 210, and a rocket effect creator 225. It should be appreciated that fluid progress bar generator 115 and rocket effect generator 120 as shown in FIG. 2 can include more or fewer components than those shown in FIG. 2. Further, one or more components in fluid progress bar generator 115 and rocket effect generator 120 (e.g., threshold checker 205 and threshold determiner 210) can be implemented as a single function or application shared by both subsystems or integrated into one of the subsystems where it can be accessible by the other subsystem.

One or more communication paths can be provided to enable one or more of the components to communicate with and exchange data with one another. The various components described in FIG. 2 can be implemented in software, hardware, or a combination thereof.

In some embodiments, threshold determiner 215 is configured to determine a triviality threshold for a task being performed. As mentioned, the triviality threshold can be the threshold at which an average person would deem the task as being "complete" while the task may be only "substantially complete." For instance, an average person may deem a web page loading task as appearing "complete" or the web page as being "visually complete" when key components of the web page (e.g., the leading news article) are loaded. Hence, the triviality threshold is determined to be met when the key components of the web page are loaded.

The triviality threshold in some embodiments can be different from task to task. In some embodiments, the triviality threshold for different tasks can be met upon satisfying a different set of criteria. For instance, the triviality threshold for the loading of a web page on a news website can be set at when the articles on the page have been loaded while the triviality threshold for the loading of a web page on a retail website can be set at when the product images have been loaded. In another instance, the triviality threshold relating to a particular website can be net when a threshold percentage of the total area of elements rendered on the web page is loaded. In even another instance, the triviality threshold can be met when everything in the page from different URLs aside from objects from a particular URL has been loaded. The triviality threshold for each task can be user configurable (e.g., via a preferences setting) or set by a system administrator or web developer to a default setting.

In some embodiments, threshold determiner 210 can determine the triviality threshold for threshold checker 205 to use in checking whether the threshold is met. Threshold checker 205 can receive various information relating to a task (e.g., information necessary for determining whether the triviality threshold for the task is met) from render engine 135. In this example, threshold checker 205 can obtain a percentage of the total area of elements rendered on the web page from render engine 135 and determine whether the received percentage passes the threshold percentage determined by threshold determiner 210. Upon determining that the received percentage passes the threshold percentage, threshold checker 205 determines that the triviality threshold is met.

In some embodiments, in response to determining that the triviality threshold is met, rocket effect creator 225 in rocket effect generator 120 can determine a visual cue or a type of animation and visually display the visual cue on the progress bar. Rocket effect creator 225 in some embodiments can cause render engine 135 to display a "rocket effect animation" where the progression of the completion status indicator in the progress bar accelerates toward one end of the progress bar that makes it look as if the completion status indicator of a task "rocketed" to completion.

In some embodiments, before threshold checker 205 determines that the triviality threshold is met, fluid progress bar generator 115 can determine how progression in the progress bar is to be displayed. Under-reporter 215 in fluid progress bar generator 115 can receive progress values indicating a completion status of the task from render engine 135 and cause render engine 135 to display a completion status indicator that underreports the actual progress status of the task. In some embodiments, upon receiving a progress value, under-reporter 215 can determine an estimated completion time for the task at hand (e.g., using a lookup table). The estimated completion time can be an over-estimate of the amount of time necessary to complete the task. As such, the completion status indicator shown by the progress bar would indicate a slower progression (e.g., by incrementing in smaller increments) than the actual progress of the task.

Progression smoothening module 220 in some embodiments can construct a linear equation using the estimated completion time. Progression smoothening module 220 can use the constructed linear equation to determine a next location to which the completion status indicator of the task should increment in the progress bar. Upon determining the next location, progression smoothening module 220 can cause render engine 135 to display the incremental progress of the task using the completion status indicator in the progress bar. In some embodiments progression smoothening module 220 can continue to determine the next location to which to increment the completion status indicator based on the progress values front render engine 135 and the constructed linear equations. Progression smoothening module 220 can continue to cause render engine to display a smooth progression of the completion status indicator of the task in the progress bar until threshold checker 205 determines that the triviality threshold is met and rocket effect creator 225 causes render engine 135 to display a "rocket effect."

Figure 3:
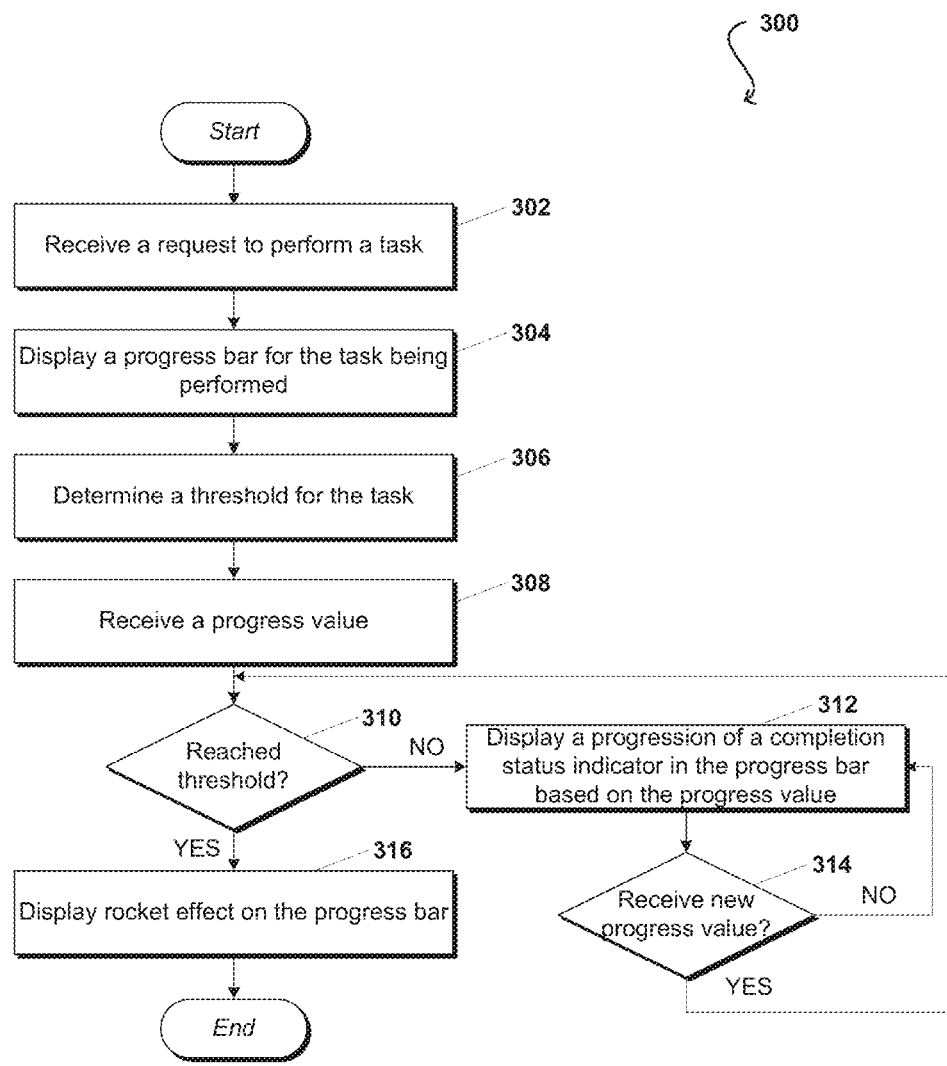
FIG. 3 conceptually illustrates a process for determining when to display the "rocket effect" in a progress bar in accordance with some embodiments.

FIG. 3 conceptually illustrates a process 300 for determining when to display the "rocket effect" in a progress bar in accordance with some embodiments. As described, render engine 135 in some embodiments can render a visual cue such as a "rocket effect" upon determining that a triviality threshold is met. Some or all of the process 300 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program to be executed by processing unit(s), such as a browser application. The computer-readable storage medium may be non-transitory.

At block 302, process 300 can receive a request to perform a task such as loading a particular web page. For example, a browser application can receive a request upon a user entering a URL for a web page or upon the user activating a hyperlink embedded in a page. At block 304, process 300 can display a progress bar for the task being performed. The progress bar can display a completion status indicator in the progress bar that represents a progress status of a task using a such that the user can visualize the status of the ongoing task.

At block 306, process 300 can determine a triviality threshold for the task. The triviality threshold in some embodiments can be a static threshold preconfigured by a user or by an administrator. For instance, the static threshold can be a percentage of the task that is complete. In the instance for loading a web page, the triviality threshold can be a percentage of the total area of elements rendered on the web page. In some embodiments, the triviality threshold can be dynamically determined using a set of metrics. For instance, some embodiments can determine the triviality threshold by determining a type of web page to be loaded and determining the amount and/or types of objects in the page that need to be loaded (e.g., using a lookup table) based on the type of web page for the page to be deemed "visually complete" to a user.

At block 308, process 300 can receive a progress value for the task. During the web page loading process, render engine in some embodiments can periodically send progress values indicating a total loaded percentage of a page to the browser application. At block 310, process 300 can determine whether the triviality threshold is reached. Browser application in some embodiments can determine whether the triviality threshold is met using the progress value.

When process 300 determines that the triviality threshold is reached, process 300 displays a rocket effect in the progress bar at block 316. When process 300 displays the rocket effect, the process ends. On the other hand, when process 300 determines that the triviality threshold is not reached, at block 312, process 300 displays a progression of completion status indicator of the task in the progress bar based on the progress value. In order to display the progression of the completion status indicator for the task, web browser in some embodiments can determine a next location to which to increment the completion status indicator using the progress value.

At block 314, process 300 can determine whether a new progress value has been received. When process 300 determines that a new progress value has been received, process 300 returns to block 310 and determines whether the threshold is reached. When process 300 determines that a new progress value has not been received, process 300 returns to block 312 to continue displaying the progression of the completion status indicator of the task in the progress bar. As such, browser application can resume computing the next location to which to increment the completion status indicator in the progress bar.

In some embodiments, upon determining that a threshold is met, browser application can display a visual cue or a type of animation to indicate to the user that the task is "substantially complete" or that the web page is "visually complete to a user." FIG. 4 illustrates an example process 400 of some embodiments for displaying the rocket animation. One of ordinary skill will recognize that process 400 can be performed at block 316 of process 300 in some embodiments.

At block 402, process 400 can identify the type of animation to show when the threshold is met. In response to determining that the threshold is met, browser application can identify the type of animation to show as a visual cue to the user. In some embodiments, the type of animation can be user configurable or pre-configured by the system administrator as a default setting. The type of animation can include one or more accelerated progression of a completion status indicator in the progress bar from a current position to another position in the progress bar in one embodiment. In some embodiments, the type of animation can include a "rocket effect" or "rocket animation" where the completion status indicator in the progress bar accelerates to one end of the progress bar. At block 404, process 400 can display the identified type of animation in the progress bar.

In some embodiments, before the threshold is met, browser application can provide a progress bar that displays a completion status indicator for the task that underreports the actual status of the task. Some embodiments underreport the completion status of an ongoing task in the progress bar to avoid the completion status indicator being stalled at the end of the progress bar due to miscalculation in the completion status. FIG. 5 illustrates an example process 500 of some embodiments for displaying an underreported progress status indicator for a task in a progress bar. One of ordinary skill will recognize that process 500 can be performed at block 312 of process 300 in some embodiments. At block 502, process 500 can receive a progress value for a task. In some embodiments, browser application can periodically receive a progress value from a render engine such as render engine 135 in FIG. 1.

At block 504, process 500 can determine, based on the progress value, another progress value less than the progress value received at block 502. In some embodiments, browser application can receive a progress value for a task from a render engine and determine an estimated time until the task would be complete (e.g., is a lookup table). Browser application in some embodiments can construct a linear equation based on the estimated completion time. Using the linear equation, browser application can determine the next location to where the completion status indicator in the progress bar should animate after the period of time. The period of time can be preconfigured by the user or pre-selected by an administrator.

At block 506, process 500 can display the completions status indicator for the task in the progress bar based on the other value that underreports the actual completion status of the task. Browser application in some embodiments can display an incremented progress bar where the completion status indicator of the task indicates the other progress value calculated from the linear equation at block 504.

FIG. 6 illustrates an example process 600 of some embodiments for displaying a progression of the completion status indicator for a task in a progress bar. One of ordinary skill will recognize that process 600 can be performed at block 312 of process 300 in some embodiments. Process 600 can be executed, e.g., in a browser application. In some embodiments, a browser application can provide a progress bar that allows a user to visualize a completion status of a task (e.g., via a completion status indicator and a status progression along the progress bar. Some embodiments can generate a smooth progression using linear equations constructed using a time estimate until completion of the task. At the same time, web browser in some embodiments can display a progression of the completion status indicator for the task that underreports the actual status of the task.

At block 602, process 600 can receive a progress value for a task such as loading a web page. In response to receiving a user request to load a web page, browser application in some embodiments can receive progress values from a render engine such as render engine 135 in FIG. 1. In some embodiments, the progress values can indicate a total percentage of the web page that has been loaded at a current time.

At block 604, process 600 can determine an estimated load time based on the progress value received at block 602. Browser application in some embodiments can determine the amount of time required to load the rest of the web page based at least in part on the percentage of the web page that has already been loaded and the amount of time it took to load that amount. In some embodiments, browser application can determine the amount of time required to load the rest of the web page using a lookup table. Browser application in some embodiments can map the progress value to an estimated time in the lookup table. The lookup table can be configurable by a user or a system administrator.

In some embodiments, the system administrator can configure and fine tune the lookup table such that the estimated would be more accurate. Browser application in some embodiments can use other attributes in addition to the progress value for the task, such as the type of web page being loaded, to compute the estimated load time. Further, in some embodiments, browser application can determine the estimated load time in such a way that over-estimates the amount of time it could possibly take to load the rest of the web page. By estimating a longer duration for the web page to finish loading, browser application in some embodiments can increment the completion status indicator in the progress bar in smaller increments such that it would cause an underreporting of the actual status for the task.

At block 606, process 600 can construct a linear equation using the estimated load time determined from block 604. The linear function F(t) would allow the browser application to determine a location within the progress bar to where the completion status indicator should be incremented based on time. In some embodiments, the linear function F(t) can take as an argument the time since the beginning of a page load and return a value with an X position that indicates the position where the completion status indicator in the progress bar should be at time t.

Browser application can use two known points to construct linear function F(t). In one example, the domain is the amount of time that has elapsed since the beginning of a load and the range is an X location along the fluid progress bar. One of ordinary skill would be able to determine the linear progression between two identified points by using F(t)=mt+b.

In this example, one can set the first point to include the current information: T1=elapsed time since the beginning of a load and X1=current X position (represented as a fraction of the location field's width). Then, one can determine the second point to include where the completion status should be when the task is completed, that is, T2=estimated load time and X2=1 (representing 100% of the location field's width or fluid progress final destination).

The linear equation F(t) can then be computed where $$m = \frac{X2 - X1}{T2 - T1} t \text{ and } b = 0:$$

$$F(t) = \frac{X2 - X1}{T2 - T1} t = \frac{\text{current } X \text{ position}}{\text{estimated remaining load time} -} t$$
$$\text{elapsed time since the beginning of a load}$$

100% of the location fields width −

For instance, if the location field has a width of 1000 pixels, and browser application estimates it will take 10 seconds for the page load to complete and if 3 seconds have already passed, indicating that the current location is 300, then T1=3, X1=300/1000=0.3, T2=10, X2=1000/1000=1, which would yield a function F(t)=0.1t. In some embodiments, the function is recomputed every time browser application receives a new progress value from render engine since the time estimate changes every time a new progress value is received.

At block 608, process 600 can compute a next location using the linear equation constructed in block 606. In some embodiments, browser application is set to increment every time interval set by a user or administrator, such as every 200 ms or every 250 ms. If web browser is set to animate a single animation every 200 ms, the next location for the completion status indicator in the progress bar can be determined by solving F(3 s+0.2 s)=0.1(3.2)=0.32 or 320 pixels. At block 610, process 600 can animate to the next location computed in block 608. In some embodiments, browser application can animate the completion status indicator in the fluid progress bar from location X=300 to X=320 within 200 ms.

Process 600 then ends. In embodiments where process 600 is performed at block 312 in FIG. 3, after process 600 ends, process 300 proceeds to block 314 to determine whether a new progress value has been received. If a new progress value has not been received, process 300 returns to block 312 where process 600 can be again be performed to calculate and animate the progress bar indicator to a next location within the progress bar.

Figure 7:
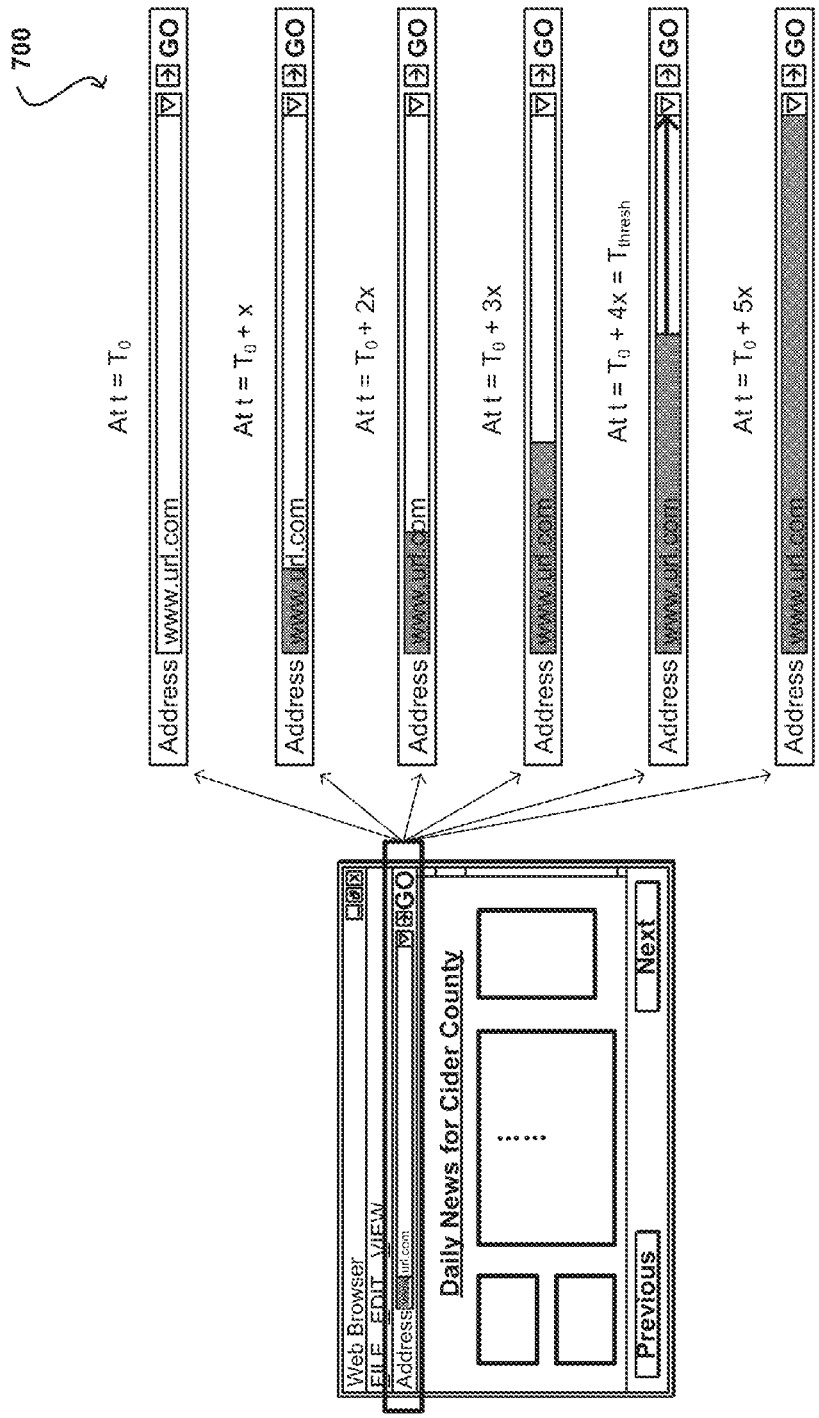
FIG. 7 illustrates an example of progression of the completion status indicator in accordance with some embodiments of the invention.

FIG. 7 illustrates an example of progression 700 of a completion status indicator for a task in a progress bar in accordance with some embodiments of the invention. As described, browser application in some embodiments can determine a threshold at which to set off the "rocket effect." In response to determining that the threshold is met (e.g., when a progress value indicates that a threshold percentage of the task has been completed), browser application can display a visual cue that alerts the user that the threshold has been met. In some instance, the visual cue can be a "rocket effect" where the progression of the completion status indicator in the progress bar accelerates dramatically to the end of the progress bar. As described, the threshold can often be set at a point in time or at a loading percentage at which the user can deem a web page to be "visually complete" in terms of loading.

In FIG. 7, a user has requested a browser application to load a web page. Upon receiving the user request (e.g., when the user types in www.url.com in the address field of the web browser), browser application in some embodiments can display a GUI including a progress bar that can indicate a status indicator for the loading of the web page. As shown at t=T0, the progress bar shows that nothing in the web page has been loaded so far. The completion status indicator for the task reflects 0% at this time. At t=T0+x, the completion status indicator of the task as indicated in the progress bar has increased to approximately 20% of the progress bar. As described, browser application in some embodiments can display an underreported status of the task in the progress bar. This can account for and minimize the chances for pauses in the progression of the completion status indicator in the progress bar. In some embodiments, browser application can display an initial boost in response to receiving the user request in loading a web page. For instance, the status in the progress bar can display a 10% increase upon the user's request regardless of whether 10% of the web page or any of the web page has already been loaded. This makes the progress bar feel more responsive to user interaction and provides improved user experience.

In some embodiments, browser application can compute the next location to which to increment the status indicator in the progress bar and animate the progression (e.g., using process 600 in FIG. 6). At t=T0+2x, the completion status has increased to approximately 15% of the progress bar. At t=T0+3x, the completion status has increased to approximately 40% of the progress bar. In some embodiments, the progress bar can display a smooth increase in the completion status indicator of the task. The rate at which the web page is being loaded can vary depending on various factors, such as the transfer rate, the bandwidth of the computing device on which the browser application is running, the servers from which information must be retrieved, etc. As browser application receives additional progress values, browser application can determine a different rate which the web page is being loaded and display a constant increase in between each receipt of a new progress value (e.g., using linear functions to compute each new location).

Upon reaching the triviality threshold at t=T0+4x=Tthresh (time at which the triviality threshold is met), the progression in the completion status indicator as shown in FIG. 7 accelerates towards the end of the progress bar to convey completion of the task in loading the web page, regardless of whether the task is actually completed. This acceleration in the progression of completion status indicator serves as a visual cue to indicate to a user that the web page is "visually complete" at this moment. At t=T0+5x, the progress bar shows completion of the task. In some embodiments, as browser application determines that the threshold has been reached, browser application can accelerate the progression to a rate at which the progress bar would immediately indicate that the task has been completed. Different embodiments may display the visual cue to the user differently. For instance, some embodiments can display the visual cue by displaying multiple spurts of accelerations instead of a single accelerated progression all the way to the end of the progress bar.

FIG. 8 illustrates an example of a time estimate table 800 of some embodiments that enables browser application to obtain a time estimate until a task is complete based on a set of parameters. In this example, time estimate table 800 provides time estimate values 810 for different progress values 805 that browser application receives from a render engine such as render engine 135 in FIG. 1. While in this example, browser application can determine a time estimate using a single parameter (i.e., a progress value), in some embodiments, browser application can determine the time estimate using multiple parameters that are not included in time estimate table 800.

As shown in this example, the estimated time until a task is complete for a progress value that is between 0% and 35% is 30 seconds. While some embodiments can provide an estimated time for a progress value, some embodiments can provide a location in the progress bar for the progress value. In some embodiments, time estimate table 800 can be stored remotely or locally in a data storage accessible to browser application. Time estimate table 800 can also be stored in filesystem of an electronic computing device in a property list format (e.g., as an eXtensible Markup Language (XML) file) in some embodiments.

In response to receiving a progress value each time, browser application can retrieve an estimated page load time from time estimate table 800 based on the progress value. Browser application can then use the estimated time to construct a linear function and increment the completion status indicator in the progress bar based on the linear function. Browser application can continually increment the completion status indicator in the progress bar based on the constructed linear function until another progress value is received. In response, browser application can construct a new linear function based on the new progress value and increment the completion status indicator in the progress bar based on the new linear function.

In some embodiments, the estimated load time can overestimate the amount of time necessary for the task to complete. As such, the linear function constructed based on the over-estimated time can cause the completion status indicator in the progress bar to increment in smaller increments such that the progress bar would essentially underreport the actual completion status of the task. Further, while browser application in some embodiments uses static mapping and a set of linear functions to determine new locations in the progress bar to increment the reported status, some embodiments can determine the new location using other attributes that would also serve to underreport the status of the task.

FIG. 9 illustrates an example sequence 900 of a progress bar that updates smoothly while underreporting an actual status of a task in accordance with some embodiments. In some embodiments, a browser application can display a fluid progress bar that updates a completion status indicator for a task in a manner that appears "smooth" or "fluid" to a user, instead of appearing "clunky." The browser application can over-estimate an amount of time required to complete the task such that the progression of the status indicator displayed in the progress bar would make smaller increments and, in turn, underreport the actual status progression of the task.

As described, the browser application can receive a progress value from a render engine, compute an estimated page load time (e.g., by mapping the progress value to an estimated time using time estimate table 800 in FIG. 8), construct a linear function using the estimated page load time, and determine a new location in the progress bar to increment the progress status indicator for a time interval. The browser application in some embodiments can then animate the progression of the task to the new location. By designating short time intervals (e.g., 200 ms, 250 ms) for determining and incrementing to a new location allows the progression of completion status indicator in the progress bar to appear smooth to a user.

In FIG. 9, browser application can receive a progress value of 40% from a render engine within a short period of time (e.g., after 5 milliseconds, 50 milliseconds, 3 seconds, 10 seconds) after receiving a user request for a particular web page. After receiving the progress value, browser application in some embodiments can determine a time estimate for the page loading to complete using time estimate table 800 in FIG. 8. Using time estimate table 800, the estimated time until the web page finishes loading is 10 seconds.

Again, as described in block 606 in process 600, browser application can construct a linear function using two known points, if the location field of the progress bar has a width of 1000 pixels and browser application (e.g., render engine) estimates that it will take 10 seconds for the load to complete, browser application can construct a linear function F(t) upon determining that 3 seconds have passed and that the current location is at X=300. In such an instance, browser application can construct linear function F(t) in a way such that the progression in the progress bar can complete within the estimated time (i.e., 10 seconds). Using $$F(t) = mt + b = \frac{X2 - X1}{T2 - T1}t = \frac{100\% \text{ of the location fields width} - \text{current } X \text{ position}}{\text{estimated remaining load time} - \text{elapsed time since the beginning of a load}}t$$

in this example, $$F(t) = \frac{1 - 0.3}{10 - 3}t = .1t.$$

In this case, if the time it takes to animate the status from a current position to a next position is set at 200 ms, then F(t)=F(3+0.2)=0.32, or around 320 pixels. As described, the time it takes to animate the status for a current position to a new position is configurable by a user or administrator in some embodiments. Further, browser application continues to update the status in the progress bar until a new progress value is received. As such, at t=3.4, since a new progress value has not been received, browser application uses the previously constructed linear equation and determines another new location. Using F(t)=0.1t, F(3.4)=0.34 of the progress bar, or 340 pixels in the progress that has a width of 1000 pixels, Browser application can continually update the completion status indicator in the progress bar using the linear function in a linear manner until a new progress value is finally received. By updating the status within short time intervals (e.g., 200 milliseconds), the progression of the completion status indicator in the progress bar can appear smooth to the user.

Subsequently, a new progress value 60% is received at t=3.4 s where the new time estimate until the page load is complete is 5 seconds according to table 800 in FIG. 8. Browser application can reconstruct a new linear function using two new points and F(t)=mt+b. One of ordinary skill would be able to determine the linear function upon identifying two known points. Therefore, in this example, $$F(t) = \frac{1 - .34}{5}t - 3.4\left(\frac{1 - .34}{5}\right) + 0.34 = 0.132t - 0.1088.$$

Using the newly constructed linear function, browser application can then determine the new endpoints at which to increment (animate) the completion status indicator after each time interval. Again, if the time interval is at 200 ms, then at t=3.6, F(3.6)=0.37 or 370 pixels. After another 200 ms, the completion status indicator is calculated to be at F(3.8)=0.39 or 390 pixels, so on and so forth.

In some embodiments, in response to receiving the user request to load a new web page, browser application can perform an increase in the completion status indicator (e.g., to 10% or 20% of the progress bar) regardless of the actual status for the task. Including this feature can make the progress bar feel responsive to user interaction.

Browser application in some embodiments can visually modify a UI element on the GUI or display a visual effect when a status of a feature changes (e.g., when the feature becomes enabled). For example, browser application can display a change in the manner a particular UI element (representing a feature) is displayed by modifying the color of the particular UI element. In another example, the browser application can display a visual appearance of a UI element representing the feature on the GUI to indicate the status change. To provide additional visibility that the status of the feature is changed, some embodiment can visually modify the UI element at the same time or immediately following the "rocket effect" described above. For example, some embodiments can modify a UI element (e.g., present a visual appearance or highlight a UI element) provide a visual effect next to one end of a progress bar following the completion of the "rocket effect" such that the animation of the rocket effect (i.e., where the progress status indicator advances from a current position to an end of a progress bar) would direct the user's attention to the modified UI element or visual effect.

Figure 10:
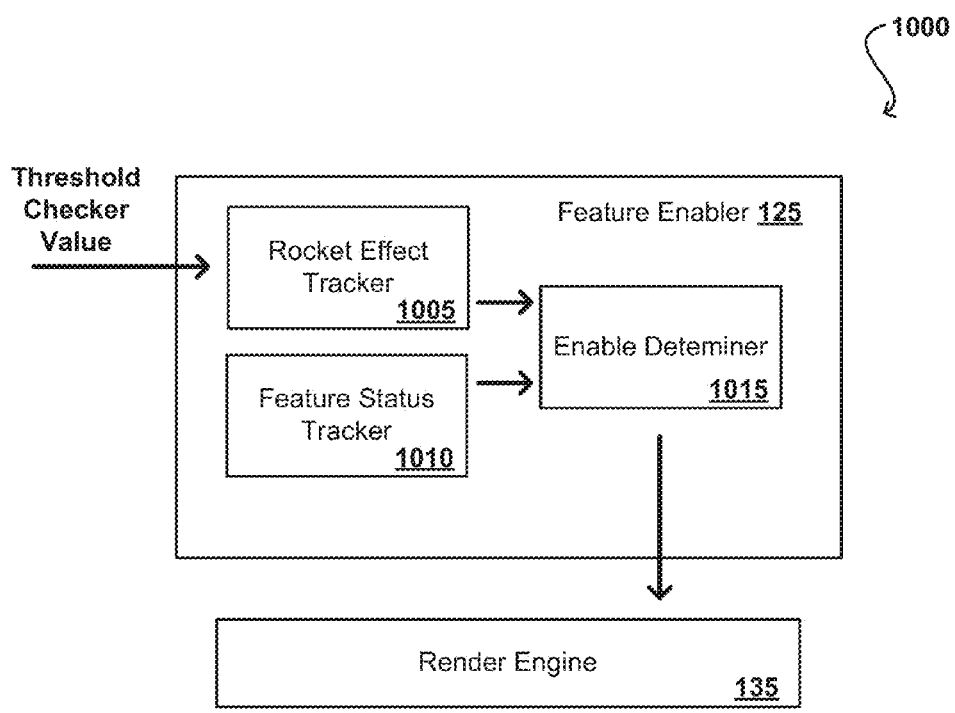
FIG. 10 illustrates an example of a more detailed diagram of feature enabler that can signal browser application to display a visual effect in response to a status change for a feature in accordance with some embodiments.

FIG. 10 illustrates an example of a more detailed diagram 1000 of feature enabler 125 (e.g., feature enabling subsystem 125 in FIG. 1) that can signal browser application to display a visual effect in response to a status change for a feature in accordance with some embodiments. In some embodiments, feature enabling subsystem 125 can include a rocket effect tracker 1005 that determines when the "rocket effect" is triggered (i.e., when the triviality threshold is met), a feature status tracker 1010 that determines whether the status for a feature has changed, and an enabler determiner 1015 that determines whether to visually modify the UI element representing the feature to convey the change in status.

In FIG. 10, rocket effect tracker 1005 can receive a signal from rocket effect generator 120 in FIG. 1 that indicates whether a triviality threshold is met and therefore the "rocket effect" triggered. In some embodiments, upon receiving the signal indicating that the threshold is met, rocket effect tracker 1005 can send a signal to enable determiner 1015 that causes enable determiner 1015 to determine whether to visually modify the UI element.

In some embodiments, in response to receiving the signal from rocket effect tracker 1005 indicating that the threshold is met, enable determiner 1015 can send a request to feature status tracker 710 to determine whether the status of the feature is changed. If the status of the feature is determined to have been modified, enable determiner 1015 can send a request to render engine 115 to visually modify the UI element.

In some embodiments, feature status tracker 1010 can determine that the status of the feature has been changed prior to the triviality threshold being met. Feature status tracker 1010 in some embodiments can send a signal to enable determiner 1015 indicating that the feature is enabled. Enable determiner 1015 can then send a signal to render engine 135 to visually modify the UI element upon receiving a signal from rocket effect tracker 1005 indicating that the triviality threshold has been met.

In some embodiments, render engine 135 can visually modify the UI element immediately following the "rocket effect" (i.e., as the completion status indicator arrives at one end of the progress bar from a current position when the threshold is determined to have met). Modifying the UI element following the "rocket effect" can direct the user's attention to the modified UI element. Some embodiments display the visual cue at the same time as the "rocket effect" (i.e., the animation of the accelerated progress status indicator in the progress bar).

Figure 11:
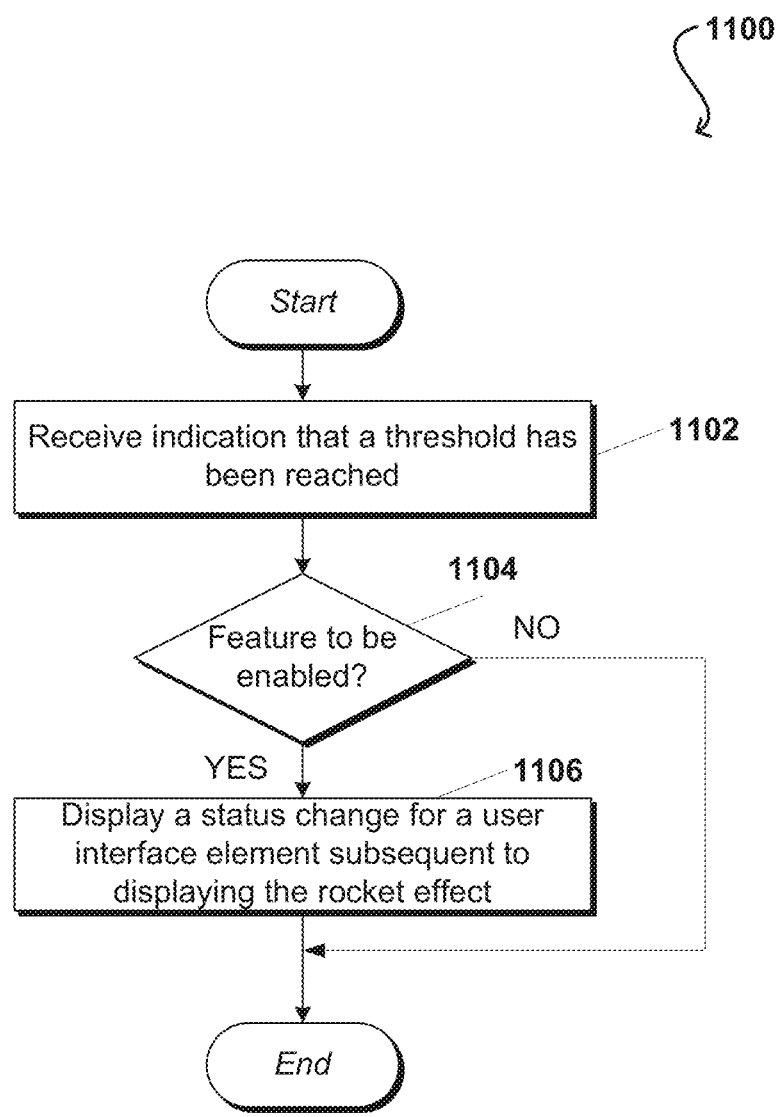
FIG. 11 illustrates an example process of some embodiments for visually modifying a user interface element in response to a feature being enabled when the triviality threshold is met.

FIG. 11 illustrates an example process 1100 of some embodiments for visually modifying a UI element in response to a feature being enabled when the triviality threshold is met. As described, in some embodiments, feature enabler 125 of FIG. 11 can determine whether the status of a feature is changed (e.g., a feature is ready to be enabled) when the threshold is met and thereby cause render engine 135 to display a change in the visual state of a UI element representing the feature's status. One of ordinary skill will recognize that process 1100 can be performed after process 300 determines that the threshold has been met at block 310 in some embodiments.

At block 1102, browser application can receive an indication that a the triviality threshold has been reached. At block 1104, browser application can determine whether a status of a feature is changed or whether the feature is to be enabled. Some embodiments can determine whether a feature status is changed or whether the feature is to be enabled by inquiring a module that is responsible for rendering the feature when it is enabled. In some embodiments, browser application can determine that a feature status is changed when the feature becomes functional from being non-functional. For instance, a feature that allows readers to view a web page in a different manner is changed or enabled when the different view is populated and ready for viewing.

If browser application determines that the feature status is modified, at block 1106, browser application can visually modify a state of a UI element representing the feature status subsequent to displaying the "rocket effect." If web browser determines that the feature is not to be enabled, process 1100 ends. In some embodiments, after process 1100 ends, browser application displays the "rocket effect" without visually modifying the UI element.

Figure 12:
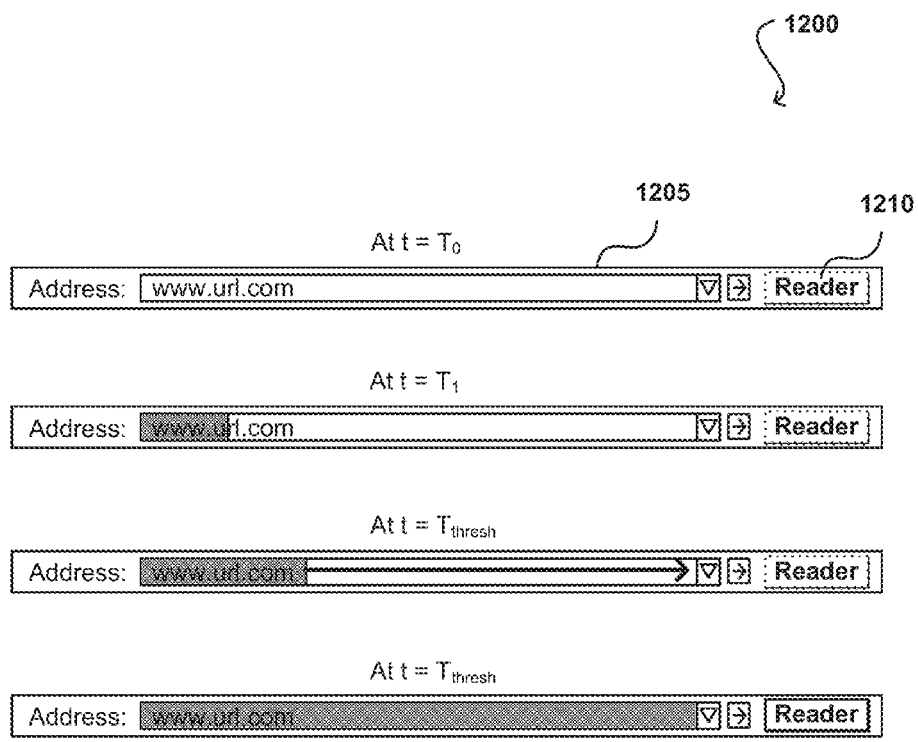
FIG. 12 illustrates an example progression of a completion status indicator for a task in a progress bar and visually modifying a UI element representing a feature in accordance with some embodiments.

FIG. 12 illustrates an example progression 1200 of a completion status indicator for a task in a progress bar 1205 and visually modifying a UI element 1210 representing a feature in accordance with some embodiments. At t=T0, progress bar 1205 displays a completion status indicator indicating a 0% completion status for a task. UI element 1210 representing a status for a feature can be dotted as shown in FIG. 12, indicating that the feature is currently disabled. At t=T1, the completion status indicator shows that the status of the task is approximately 20% complete. As described, in some embodiments the completion status indicator displayed in progress bar 1205 can be an underreported status of the task. UI element 910 remains disabled at this stage.

At t=Tthresh, progression of the completion status indicator accelerates toward one end of the progress bar to indicate completion of the task. In some embodiments, browser application can determine whether the feature is enabled when the threshold is met. In this instance, the feature is ready to be enabled when the threshold is met. Before the completion status indicator reaches the end of the progress bar, UI element 1210 remains disabled in this example.

In some embodiments, UI element 1210 can be enabled when browser application determines that the threshold is met. In this instance, the visual cue indicating the status change for the feature (represented by UI element 1210) is enabled when the progression of the completion status indicator reaches the end of the progress bar. Changing a visual state of UI element 1210 as the progression of the completion status indicator reaches the end of the progress bar allows the user's attention to be directed to the UI element 1210.

Figure 13:
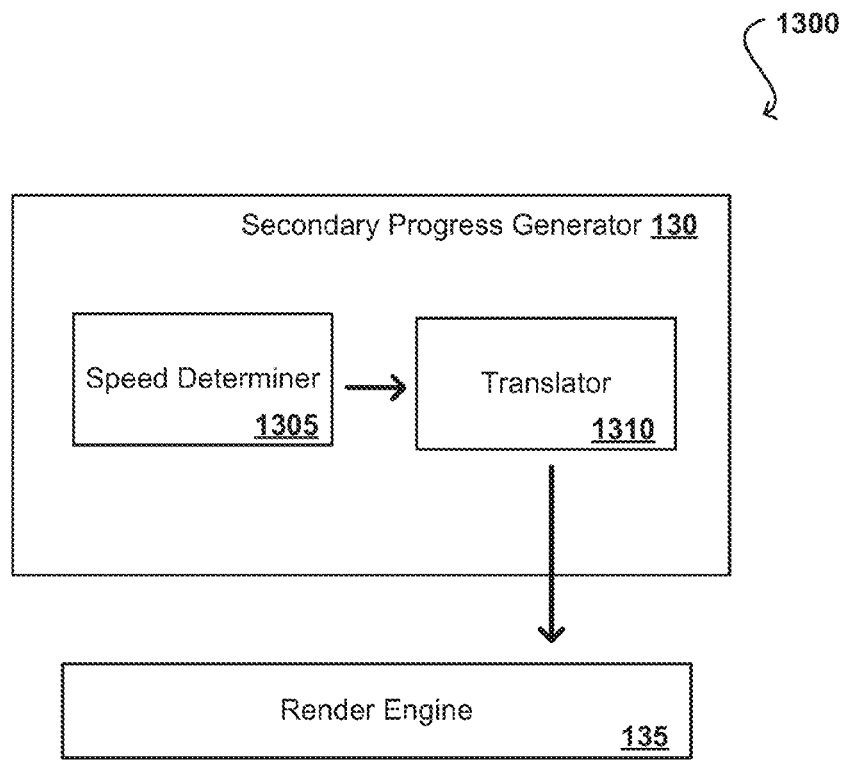
FIG. 13 illustrates an example of a more detailed diagram of secondary progress generator and render engine for rendering a secondary progress indicator in addition to a completion status indicator for a task in a progress bar according to some embodiments.

FIG. 13 illustrates an example of a more detailed diagram 1300 of secondary progress generator 130 and render engine 135 for rendering a secondary progress indicator in addition to a status of a task in a progress bar according to some embodiments. In some embodiments, a browser application can provide a progress bar that displays a secondary progress indicator along with the completion status indicator for the task. The secondary progress indicator can convey additional information about a task including a speed at which the task is currently being performed. Secondary progress generator 130 can determine a current speed at which a task is being performed and a type of animation corresponding to the determined speed, while render engine 135 can display the type of animation corresponding to the determined speed.

In some embodiments, secondary progress generator can include a speed determiner 1305 that can determine a current speed at which the task is being performed, and a translator 1310 that can determine a type of animation associated with a speed. When speed determiner 1305 determines a current speed at which a task is being performed (e.g., a download rate, a transfer rate), the current speed can be sent to translator 1310. Translator 1310 can then determine the type of animation associated with the current speed. Secondary progress generator 130 can then send the type of animation to render engine 135 for display to the user.

Figure 14:
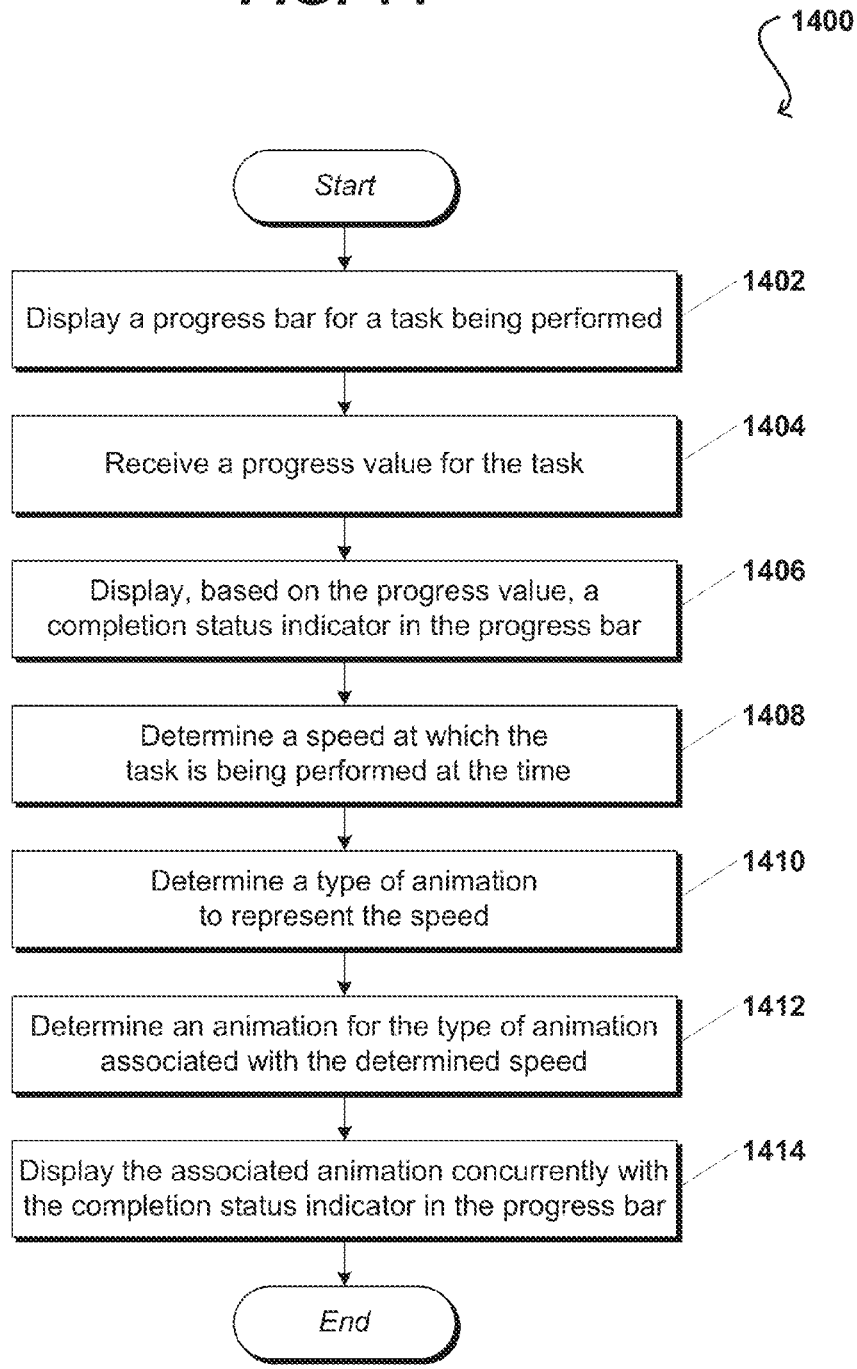
FIG. 14 illustrates an example process of some embodiments for displaying a secondary progress indicator along with the completion status indicator of the task in a progress bar.

FIG. 14 illustrates an example process 1400 of some embodiments for displaying a secondary progress indicator along with the completion status indicator for the task in a progress bar. In some embodiments, the secondary progress indicator can convey additional information about the task undergoing completion, such as a current speed at which the task is being performed. At block 1402, process 1400 can display a progress bar for a task being performed. Browser application can display the progress bar for a web page loading in some embodiments. At block 1404, process 1400 can receive a progress value for the task. As described, browser application can receive a progress value for loading a web page from a render engine in some embodiments.

At block 1406, browser application can display a completion status indicator for the task in the progress bar based on the progress value. As mentioned, in some embodiments, the completion status indicator displayed in the progress bar can underreport the completion status of the task. At block 1408, process 1400 can determine a speed at which the task is being performed. In some embodiments, browser application (e.g., speed determiner 1305 in FIG. 13) can determine a speed at which the page is loading at the particular moment, based at least in part on the network connection, the transfer rate, location of the web server, number and size of objects to be loaded for the web page, etc.

At block 1410, process 1400 can determine a type of animation to be used to represent the speed determined at block 1408. In some embodiments, browser application (e.g., translator 1310 in FIG. 13) can determine a type of animation from a list of different types of animation including a spinning wheel animation where the wheel spins faster when the determined speed is faster, a wave frequency animation where the waves displayed in a progress bar is at a high frequency when the determined speed is faster, etc. In some embodiments, the user can select the different types of animation to be used to represent the speed.

At block 1412, process 1400 can determine an animation for the type of animation associated with the determined speed. In some embodiments, browser application (e.g., translator 1310) can map the determined speed to a corresponding animation in the type of animation. For instance, browser application can determine that a level three speed corresponds to a wave animation that is medium frequency using a lookup table. At block 1414, process 1400 can display the associated animation concurrently with the completion status indicator in the progress bar. In some embodiments, browser application can cause render engine 135 in FIG. 1 to display the associated animation simultaneously along with progression of the completion status indicator in the progress bar.

FIG. 15 illustrates another example progression 1500 for displaying a secondary progress indicator along with a completion status indicator for a task in a progress bar according to some embodiments. In some embodiments, a browser application can display multiple indicators in a progress bar to convey different types of information to the user. As shown in FIG. 15 at t=progress bar displays the completion status indicator to be at approximately ¼ of the progress bar, along with a secondary progress indication represented by the density of the completion status indicator. In this case, the density of the completion status indicator is fairly low (as the dots are spaced sparsely), indicating that the speed at which the task is being performed is fairly slow.

At t=T2, progress bar displays a completion status indicator to be at approximately ⅓ of the progress bar, along with a secondary progress indication with high density. At t=T3, progress bar displays a completion status indicator to be at around ½ of the progress bar, along with a secondary progress indication at medium density. The lessened density indicates that the speed at which the task is being performed has decreased from t=T2. In some embodiments, textual data can accompany the density display to convey the exact speed at which the task is being performed. In some instances, the secondary progress indicator can appear only if the user's cursor hovers over the progress bar or the progress bar indicator, indicating that the user would like to have additional information about the task. Further, browser application can display the secondary progress indicator in the portion of the progress bar that is not occupied by the completion status indicator such as not to obstruct the web address to the viewer.

FIG. 16 illustrates an example progression 1600 for displaying another type of secondary progress indicator along with a completion status indicator of a task in a progress bar according to some embodiments. In some embodiments, a browser application can display another type of indicator, such as ripples emanating from the edge of the completion status indicator in a progress bar to convey additional information to the user. At t=T1, progress bar displays a completion status around ⅔ of the progress bar, along with a secondary progress indication represented by ripples emanating from the edge of the completion status indicator/bar that is inching forward. In this case, the frequency of the ripples are high, indicating that the speed at which the web page is being loaded is fast.

At t=T2, progress bar displays the completion status indicator to occupy around ½ of the progress bar, along with a secondary progress indication displaying medium frequency ripples. In this case, the speed at which the web page is being loaded is currently at a higher speed than the speed at t=T1. At t=T3, progress bar displays a completion status indicator to occupy around ⅔ of the progress bar, along with a secondary progress indication displaying low frequency ripples. The lowered frequency indicates that the speed at which the task is being performed has decreased from t=T2. In some embodiments, additional animation effects can be shown in the progress bar. For example, browser application can display another type of animation in addition to secondary progress indicator simultaneously in order to convey a speed at which a subtask (e.g., loading a particular object for the web page) is being performed.

FIG. 17 illustrates another example progression 1700 for displaying a type of secondary progress indicator along with a completion status indicator for a task in a progress bar according to some embodiments. In some embodiments, a browser application can display another type of indicator, such as a spinning wheel, in a progress bar to convey a current speed at which a task is being performed to the user. At t=T1, progress bar displays a completion status indicator to be around ⅖ of the progress bar, along with a secondary progress indication represented by a spinning wheel in the progress bar. In this case, the speed at which the wheel is spinning is fast (indicated by the three arrows), indicating that the rate at which the web page is being loaded at the moment is high.

At t=T2, progress bar displays a completion status indicator to occupy around ½ of the progress bar, along with a secondary progress indication of a slowly spinning wheel. In this case, the speed at which the web page is being loaded is currently at a higher speed than the speed at t=T1. At t=T3, progress bar displays a completion status indicator to occupy around ⅔ of the progress bar, along with a secondary progress indication of a wheel that is spinning faster than at T=T2. The double arrows indicate that the speed at which the task is being performed has increased from t=T2. Different types of animation can be used in different embodiments. In some embodiments, the types of animation is configurable by the user and/or the system administrator.

Many of the above-described features and applications can be implemented as software processes that are specified as a set of program instructions encoded on a computer readable storage medium. When these program instructions are executed by one or more processing units, the program instructions cause the processing unit(s) to perform the actions indicated in the instructions. Examples of computer readable storage media include CD-ROMs, flash drives, RAM chips, hard drives, EPROMs, etc. The computer readable storage media does not include carrier waves and electronic signals passing wirelessly or over wired connections. "Software" refers generally to sequences of instructions that, when executed by processing unit(s) cause one or more computer systems to perform various operations, thus defining one or more specific machine implementations that execute and perform the operations of the software programs.

Figure 18:
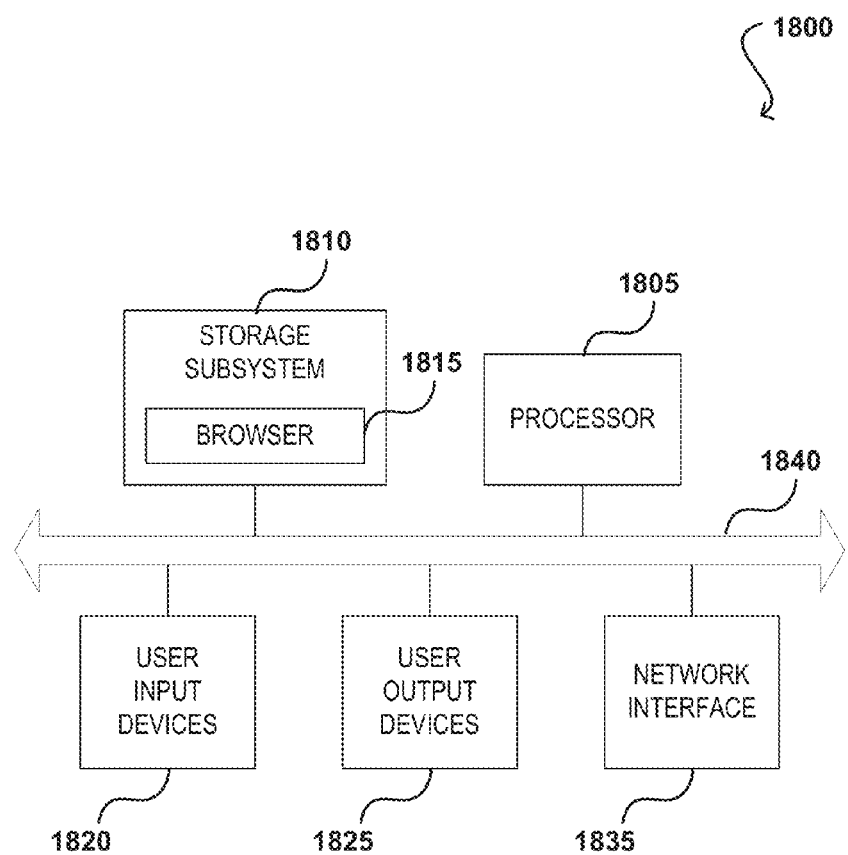
FIG. 18 illustrates a computer system according to an embodiment of the present invention.

FIG. 18 illustrates a computer system 1800 according to an embodiment of the present invention. Progress bar system 100 can be implemented within a computer system such as computer system 1800 shown here. Computer system 1800 can be implemented as any of various computing devices, including, e.g., a desktop or laptop computer, tablet computer, smart phone, personal data assistant (PDA), or any other type of computing device, not limited to any particular form factor. Computer system 1800 can include processing unit(s) 1805, storage subsystem 1810, input devices 1820, display 1825, network interface 1835, and bus 1840.

Processing unit(s) 1805 can include a single processor, which can have one or more cores, or multiple processors. In some embodiments, processing unit(s) 1805 can include a general-purpose primary processor as well as one or more special-purpose co-processors such as graphics processors, digital signal processors, or the like. In some embodiments, some or all processing units 1805 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1805 can execute instructions stored in storage subsystem 1810.

Storage subsystem 1810 can include various memory units such as a system memory, read-only memory (ROM), and a permanent storage device. The ROM can store static data and instructions that are needed by processing unit(s) 1805 and other modules of electronic device 1800. The permanent storage device can be a read-and-write memory device. This permanent storage device can be a non-volatile memory unit that stores instructions and data even when computer system 1800 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 1810 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 1810 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 1810 can store one or more software programs to be executed by processing unit(s) 1805, such as a browser application 1845. As mentioned, "software" can refer to sequences of instructions that, when executed by processing unit(s) 1805 cause computer system 1800 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 1810, processing unit(s) 1805 can retrieve program instructions to execute and data to process in order to execute various operations described herein.

A user interface can be provided by one or more user input devices 1820, display device 1825, and/or and one or more other user output devices (not shown). Input devices 1820 can include any device via which a user can provide signals to computing system 1800; computing system 1800 can interpret the signals as indicative of particular user requests or information. In various embodiments, input devices 1820 can include any or all of a keyboard touch pad, touch screen, mouse or other pointing device, scroll wheel, click wheel, dial, button, switch, keypad, microphone, and so on.

Display 1825 can display images generated by electronic device 1800 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 1825. Examples include indicator lights, speakers, tactile "display" devices, printers, and so on.

In some embodiments, display 1825 can provide a graphical user interface, in which visible image elements in certain areas of display 1825 are defined as active elements or control elements that the user selects using user input devices 1820. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in display 1825. Other user interfaces can also be implemented.

Network interface 1835 can provide voice and/or data communication capability for electronic device 1800. In some embodiments, network interface 1835 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 1835 can provide wired network connectivity (e.g., Ethernet) in addition to or instead of a wireless interface. Network interface 1835 can be implemented using a combination of hardware (e.g., antennas, modulators/demodulators, encoders/decoders, and other analog and/or digital signal processing circuits) and software components.

Bus 1840 can include various system, peripheral, and chipset buses that communicatively connect the numerous internal devices of electronic device 1800. For example, bus 1840 can communicatively couple processing unit(s) 1805 with storage subsystem 1810. Bus 1840 also connects to input devices 1820 and display 1825. Bus 1840 also couples electronic device 1800 to a network through network interface 1835. In this manner, electronic device 1800 can be apart of a network of multiple computer systems (e.g., a local area network (LAN), a wide area network (WAN), an Intranet, or a network of networks, such as the Internet. Any or all components of electronic device 1800 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit (s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 1805 can provide various functionality for electronic device 1800. For example, processing unit(s) 1805 can execute browser application 1845. Browser application 1845 can provide various functionality such as the ability to retrieve and display content items from local or remote sources (e.g., using HTTP or other data transfer protocols to retrieve and display web pages) in rendering a web page and the ability to receive and interpret user input pertaining to the content items, such as selection of a hyperlink, selection of an item to view, submission of data by the user in response to a particular content item (e.g., filling out a form on an interactive web page), and so on. In some embodiments, browser application 1845 can provide a progress bar that displays a completion status indicator representing a completion status of a task such as loading a web page. Various additional information can be display within the progress bar e.g., via animation effects. For example, a speed at which a web page is being loaded at a particular moment in time can be presented by browser application 145 through animating ripples with varying frequencies.

It will be appreciated that computer system 1800 is illustrative and that variations and modifications are possible. Computer system 1800 can have other capabilities not specifically described here (e.g., mobile phone, global positioning system (GPS), power management, one or more cameras, various connection ports for connecting external devices or accessories, etc.). Further, while computer system 1800 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 19:
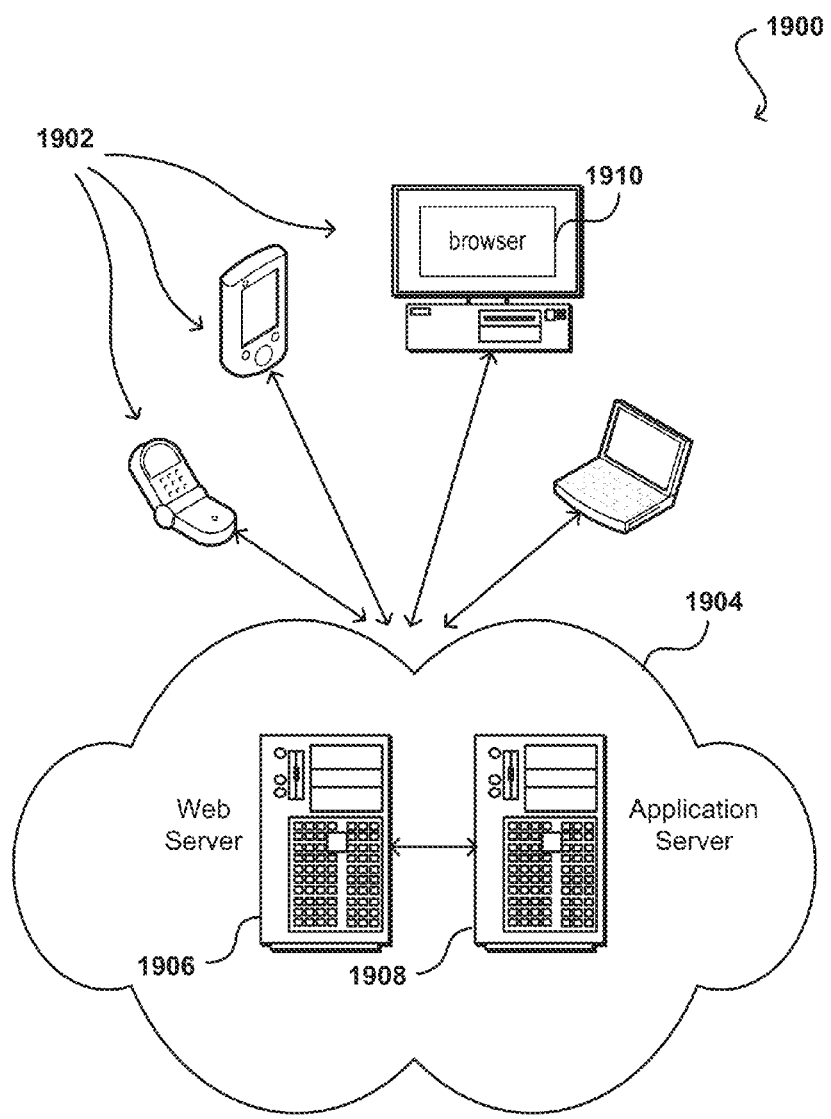
FIG. 19 illustrates an example of an environment that can implement various aspects of the present invention.

Different approaches can be implemented in various environments in accordance with the described embodiments. FIG. 19 illustrates an example of an environment 1900 that can implement various aspects of the present invention. Although a Web-based environment is used for purposes of explanation, one of ordinary skill would recognize that different environments can be used to implement various embodiments of the invention.

Environment 1900 includes an electronic client device 1902, a Web server 1906, and at least one application server 1908. Electronic client device 1902 can include any appropriate electronic device operable to send and receive requests, messages, and/or data over a network and convey information to a user of the device. Examples of such client devices include personal computers, mobile phones, laptop computers, personal data assistances and the like, Electronic client device 1902 can communicate with a Web server 1906 through at least one network where Web server 1906 can receive requests from electronic client device 1902 and serve content in response to communications over the network.

One of ordinary skill would recognize that there can be several application servers, layers or other elements, processes or components, which can be linked or otherwise configured and can interact to perform tasks such as obtaining data from a data store (not shown here). As used herein, the term "data store" can refer to any device or combination of devices capable of storing, accessing, and retrieving data, such as one or more data servers, databases, data storage devices, and/or data storage media. Application server(s) 1908 can include hardware and/or software to execute aspects of one or more applications for the client device and is capable of generating content such as text, graphics, audio and/or video to be sent to the user through Web server 1906 in the form of HTML, XML, or any other appropriate structured language. The handling of all requests and responses, as well as the delivery of content between client device 1902 and application server 1908, can be handled by Web server 1906. It should be understood that Web and application servers are not required and are merely examples components of environment 1900.

In some embodiments, Web server 1906 can run any of a variety of server or mid-tier applications, including HTTP servers, FTP servers, CGI servers, data servers, Java servers and business application servers. Web server(s) 1906 can also be capable of executing programs or scripts in response to requests from client device 1902, such as by executing one or more Web applications that can be implemented as one or more scripts or programs written in any programming language, such as Java®, C, C# or C++ or any scripting language, such as Perl, Python or TCL, well as combinations thereof.

Each of the client devices 1902 can include a display 1910 where messages and/or data received over a network can be locally rendered and displayed to the user. While browser application can cause a local render engine to display content (e.g., a web browser including content and a progress bar) to the user, processing can be performed "in the cloud" 1904 via Web server 1906 and one or more application servers 1908 in some embodiments. For example, the data transfer rate, the completion status of a task, the underreporting of a progress status of a task, the speed at which the web page is being loaded can be determined "in the cloud" 1904. Environment 1900 can be a distributed computing system using several computer systems and components interconnected through various communication links (e.g., computer networks).

While the invention has been described with respect to specific embodiments, one skilled in the art will recognize that numerous modifications are possible: different ways to display a secondary progress indicator for progress bar, different types of animation for conveying the "rocket effect," different ways to smoothen the progression of a completion status in the progress bar, different features can be enabled (aside from Safari reader button), etc. Thus, although the invention has been described with respect to specific embodiments, it will be appreciated that the invention is intended to cover all modifications and equivalents within the scope of the following claims.

What is claimed is:

1. A method, comprising:
   at a computing device with a display:
      displaying, on the display, an application with a completion status indicator, wherein:
         the completion status indicator is a bar that visually shows a completion status of a task being performed by the application, wherein the task is loading a web page; and
         one end of the bar moves towards a position that indicates completion of the task; and,
      prior to completing the task:
         while the one end of the bar is moving at a first rate towards the position that indicates completion of the task, determining whether a threshold has been reached at which the completion status indicator is configured to indicate that the task has been completed, even though the task is not completed; and,
         in response to determining that the threshold has been reached at which the completion status indicator is configured to indicate that the task has been completed, even though the task is not completed, moving the one end of the bar at a second rate, greater than the first rate, from its current position towards the position that indicates completion of the task.

2. The method of claim 1, including:
at a same time as the one end of the bar is moved at the second rate from its current position towards the position that indicates completion of the task or immediately following movement of the one end of the bar to the position that indicates completion of the task, visually modifying a user interface element in the application.

3. The method of claim 2, wherein the visually modified user interface element is located adjacent to the position that indicates completion of the task.

4. The method of claim 1, wherein moving the one end of the bar at the second rate, from its current position towards the position that indicates completion of the task, includes displaying a rocket effect animation.

5. The method of claim 1, including progressively increasing the second rate while the one end of the bar moves towards the position that indicates completion of the task.

6. A computing device, comprising:
a display;
a processor;
memory; and
one or more programs, wherein the one or more programs are stored in the memory and configured to be executed by the processor, the one or more programs including instructions for:
displaying, on the display, an application with a completion status indicator, wherein:
the completion status indicator is a bar that visually shows a completion status of a task being performed by the application, wherein the task is loading a web page; and
one end of the bar moves towards a position that indicates completion of the task; and,
prior to completing the task:
while the one end of the bar is moving at a first rate towards the position that indicates completion of the task, determining whether a threshold has been reached at which the completion status indicator is configured to indicate that the task has been completed, even though the task is not completed; and,
in response to determining that the threshold has been reached at which the completion status indicator is configured to indicate that the task has been completed, even though the task is not completed, moving the one end of the bar at a second rate, greater than the first rate, from its current position towards the position that indicates completion of the task.

7. The device of claim 6, including instructions for:
at a same time as the one end of the bar is moved at the second rate from its current position towards the position that indicates completion of the task or immediately following movement of the one end of the bar to the position that indicates completion of the task, visually modifying a user interface element in the application.

8. The device of claim 7, wherein the visually modified user interface element is located adjacent to the position that indicates completion of the task.

9. The device of claim 6, wherein moving the one end of the bar at the second rate, from its current position towards the position that indicates completion of the task, includes displaying a rocket effect animation.

10. The device of claim 6, including instructions for progressively increasing the second rate while the one end of the bar moves towards the position that indicates completion of the task.

11. A non-transitory computer readable storage medium storing one or more programs, the one or more programs comprising instructions, which when executed by a computing device with a display, cause the computing device to:
display, on the display, an application with a completion status indicator, wherein:
the completion status indicator is a bar that visually shows a completion status of a task being performed by the application, wherein the task is loading a web page; and
one end of the bar moves towards a position that indicates completion of the task; and,
prior to completing the task:
while the one end of the bar is moving at a first rate towards the position that indicates completion of the task, determine whether a threshold has been reached at which the completion status indicator is configured to indicate that the task has been completed, even though the task is not completed; and,
in response to determining that the threshold has been reached at which the completion status indicator is configured to indicate that the task has been completed, even though the task is not completed, move the one end of the bar at a second rate, greater than the first rate, from its current position towards the position that indicates completion of the task.

12. The computer readable storage medium of claim 11, including instructions, which when executed by the computing device with the display, cause the computing device to:
at a same time as the one end of the bar is moved at the second rate from its current position towards the position that indicates completion of the task or immediately following movement of the one end of the bar to the position that indicates completion of the task, visually modify a user interface element in the application.

13. The computer readable storage medium of claim 12, wherein the visually modified user interface element is located adjacent to the position that indicates completion of the task.

14. The computer readable storage medium of claim 11, wherein moving the one end of the bar at the second rate, from its current position towards the position that indicates completion of the task, includes displaying a rocket effect animation.

15. The computer readable storage medium of claim 11, including instructions, which when executed by the computing device with the display, cause the computing device to progressively increase the second rate while the one end of the bar moves towards the position that indicates completion of the task.

16. The method of claim 1, including:
at a same time as the one end of the bar is moved at the second rate from its current position towards the position that indicates completion of the task or immediately following movement of the one end of the bar towards the position that indicates completion of the task even though the task is not completed, enabling viewing of the web page while the web page continues to load.

17. The method of claim 1, wherein the threshold is based on:
a portion of a total area of elements rendered on the web page;
a portion of the web page loading task that is complete;

a type of web page being loaded; and/or an amount and/or types of objects in the web page that need to be loaded.

18. The device of claim 6, including instructions for:
at a same time as the one end of the bar is moved at the second rate from its current position towards the position that indicates completion of the task or immediately following movement of the one end of the bar towards the position that indicates completion of the task even though the task is not completed, enabling viewing of the web page while the web page continues to load.

19. The device of claim 6, wherein the threshold is based on:
a portion of a total area of elements rendered on the web page;
a portion of the web page loading task that is complete;
a type of web page being loaded; and/or
an amount and/or types of objects in the web page that need to be loaded.

20. The computer readable storage medium of claim 11, including instructions, which when executed by the computing device with the display, cause the computing device to:
at a same time as the one end of the bar is moved at the second rate from its current position towards the position that indicates completion of the task or immediately following movement of the one end of the bar towards the position that indicates completion of the task even though the task is not completed, enable viewing of the web page while the web page continues to load.

21. The computer readable storage medium of claim 11, wherein the threshold is based on:
a portion of a total area of elements rendered on the web page;
a portion of the web page loading task that is complete;
a type of web page being loaded; and/or
an amount and/or types of objects in the web page that need to be loaded.

* * * * *